(12) United States Patent
Mino et al.

(10) Patent No.: US 7,502,176 B2
(45) Date of Patent: Mar. 10, 2009

(54) COMBINED LASER SOURCE HAVING DEFLECTION MEMBER

(75) Inventors: Satoshi Mino, Minamiashigara (JP); Shinichiro Sonoda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 315 days.

(21) Appl. No.: 11/447,851

(22) Filed: Jun. 7, 2006

(65) Prior Publication Data

US 2006/0274434 A1 Dec. 7, 2006

(30) Foreign Application Priority Data

Jun. 7, 2005 (JP) ............................. 2005-166916
Aug. 19, 2005 (JP) ............................. 2005-238489

(51) Int. Cl.
*G02B 13/18* (2006.01)

(52) U.S. Cl. ............................. 359/719; 372/9; 369/112

(58) Field of Classification Search ................. 359/811, 359/812; 372/9; 369/112, 109, 110, 111
See application file for complete search history.

(56) References Cited

U.S. PATENT DOCUMENTS 5,684,781 A * 11/1997 Jeong ...................... 369/44.23

6,718,088 B2   4/2004 Okazaki et al.
7,007,845 B2 *  3/2006 Aoshima et al. ............ 235/454
2004/0233964 A1* 11/2004 Yamanaka et al. .......... 372/108
2004/0252388 A1* 12/2004 Yamanaka et al. .......... 359/834

FOREIGN PATENT DOCUMENTS

JP       2004-77779 A       3/2004

* cited by examiner

*Primary Examiner*—Timothy J Thompson
(74) *Attorney, Agent, or Firm*—Sughrue Mion, PLLC

(57) ABSTRACT

A combined laser source includes: a plurality of semiconductor lasers which contain emission elements emitting a plurality of laser beams and being separately and hermetically sealed; a plurality of collimator lenses which collimate the plurality of laser beams emitted from the emission elements of the plurality of semiconductor lasers; an optical condensing system which receives, condenses, and optically combines the plurality of laser beams collimated by the plurality of collimator lenses; and one or more deflection members which are arranged between the optical condensing system and one or more of the plurality of collimator lenses, and deflect one or more of the plurality of laser beams collimated by the one or more of the plurality of collimator lenses so that the one or more of the plurality of laser beams propagate parallel to an optical axis of the optical condensing system.

20 Claims, 15 Drawing Sheets

FIG.3
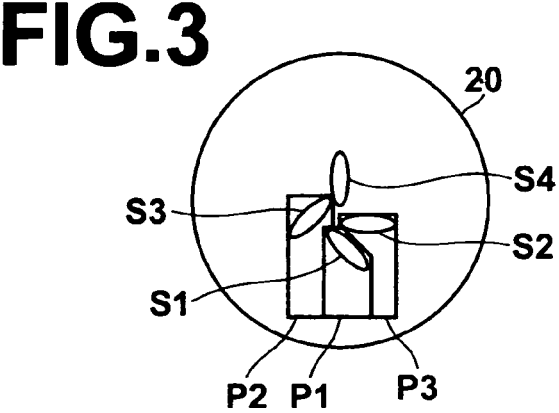
FIG.4
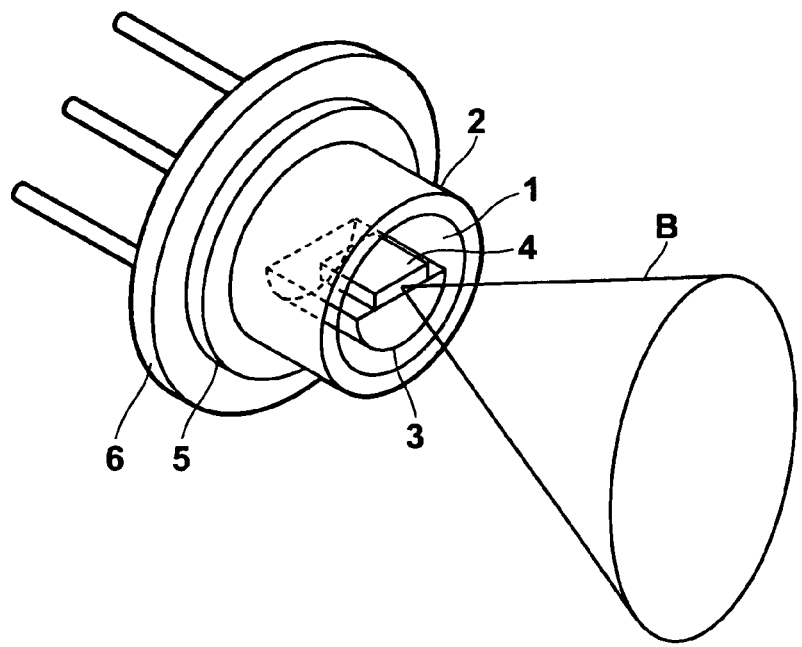
FIG.5A FIG.5B FIG.5C FIG.5D
 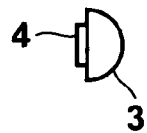  

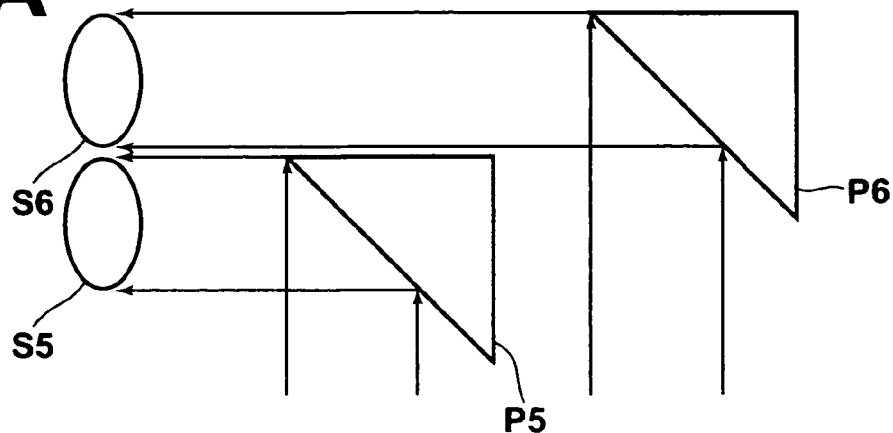
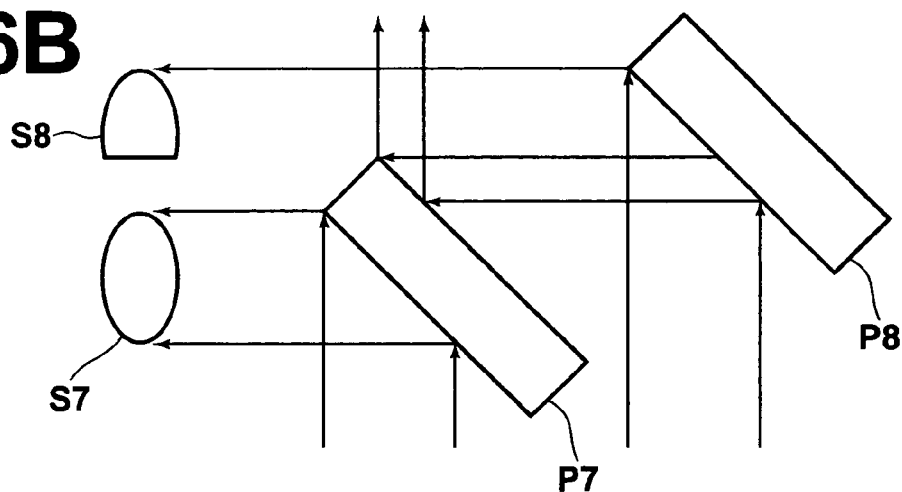
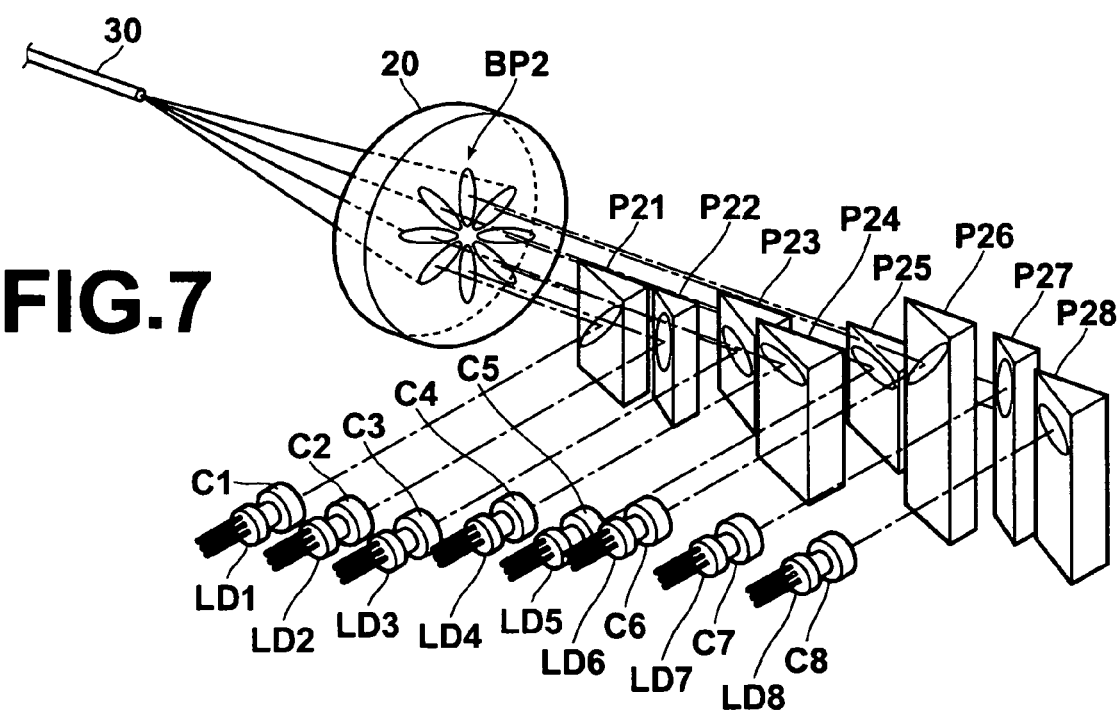

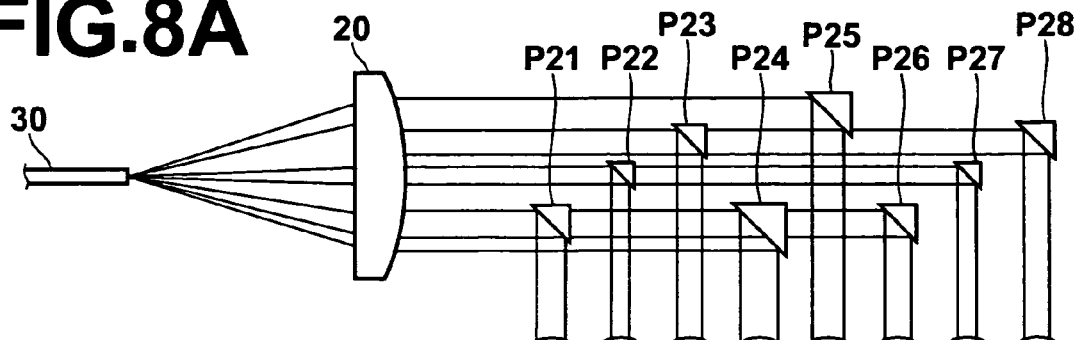
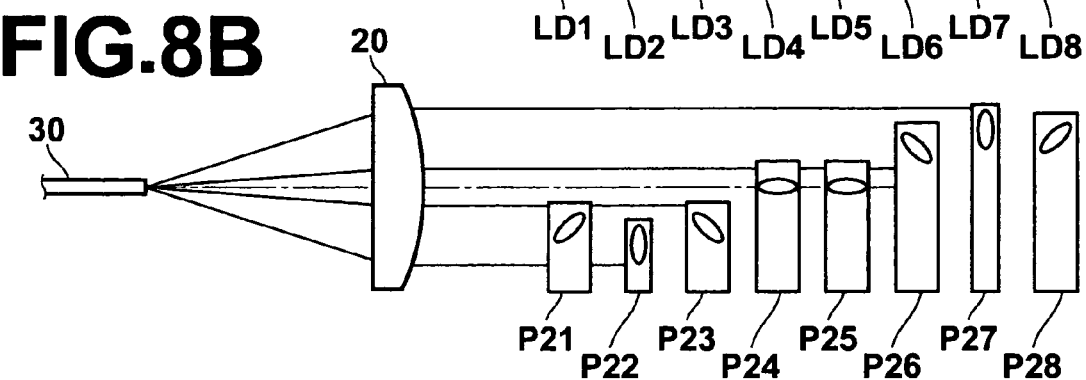
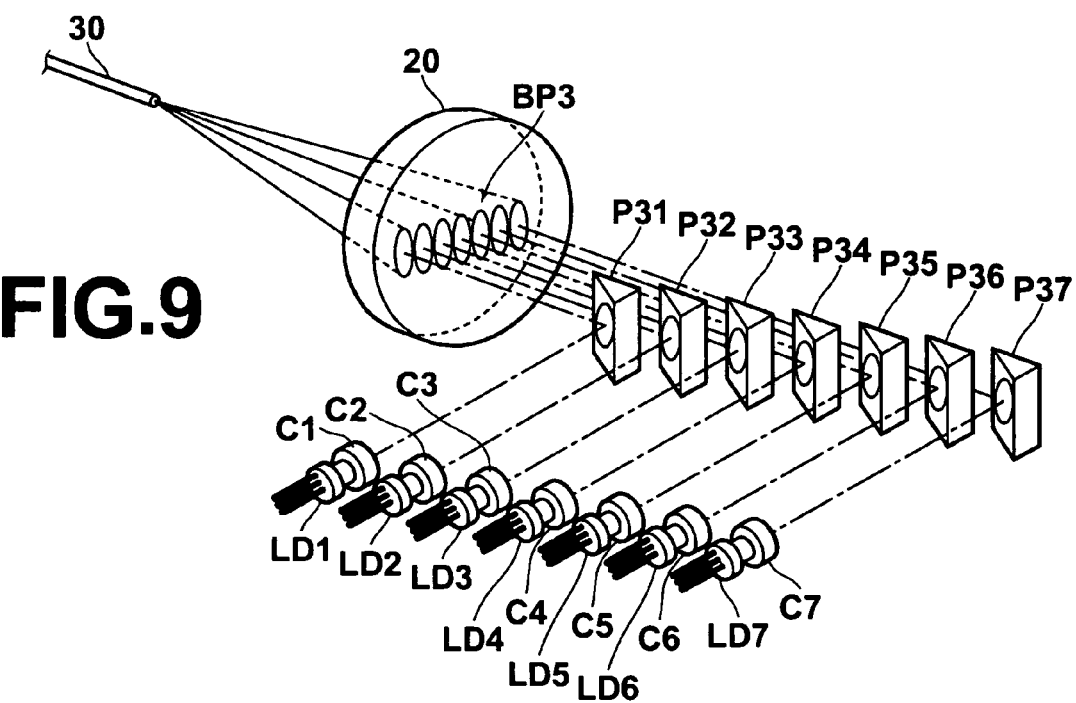

COMBINED LASER SOURCE HAVING DEFLECTION MEMBER

BACKGROUND OF THE INVENTION

1. Field of the Invention

The present invention relates to a combined laser source which optically combines laser beams emitted from a plurality of semiconductor lasers by using an optical condensing system.

2. Description of the Related Art

Conventionally, the combined laser sources which condense and optically combine a plurality of laser beams emitted from a plurality of laser-light sources by using an optical condensing system are known as high-power laser-light sources which can be used in exposure systems and the like. FIG. 25 is a plan view of an example of such a combined laser source. In the combined laser source illustrated in FIG. 25, the laser beams B1 to B7 emitted from the seven semiconductor-laser chips L1 to L7, which are aligned along a line and fixed on a heat block 10, are respectively collimated by the seven collimator lenses 11 to 17 and are condensed by the condensing lens 21 so that the collimated and condensed laser beams are optically combined on the entrance end face of the core 30a of the optical fiber 30, as disclosed in U.S. Pat. No. 6,718,088).

In addition, as disclosed in Japanese Unexamined Patent Publication No. 2004-077779, a combined laser source in which a plurality of semiconductor-laser chips are arranged along a circle on a heat block is known, where laser beams emitted from the semiconductor-laser chips are collimated by collimator lenses and are condensed by a condensing lens so that the collimated and condensed laser beams are optically combined on a light-entrance end face of a core of an optical fiber.

When the combined laser sources as disclosed in U.S. Pat. No. 6,718,088 and Japanese Unexamined Patent Publication No. 2004-077779 are used in image exposure systems, the output intensities of the combined laser sources are required to be further increased in order to reduce the exposure time.

The output intensity of a combined laser source corresponds to the amount of light per unit area. The amount of light per unit area can be increased by minimizing the core diameter of the optical fiber which the condensed laser beams enter, or increasing the number of the laser beams which are optically combined (i.e., the number of the semiconductor lasers).

It may be considered that the numerical aperture (NA) of the optical fiber should be increased in order to increase the number of the laser beams which are optically combined. However, when the numerical aperture (NA) is increased, the focal depth decreases. Nevertheless, there is a demand to increase the focal depth for relaxing tolerance in assembly of the image exposure system in which the combined laser source is to be installed. Therefore, it is impossible to increase the numerical aperture (NA) of the optical fiber.

It is possible to increase the number of the laser beams to be optically combined, without increase in the numerical aperture (NA), by increasing the focal length of the condensing lens. However, when the focal length increases, the optical magnification power increases. Since the images of the emission points of the semiconductor lasers are magnified by the magnification power, and the magnified images of the emission points are formed on the light-entrance end face of the optical fiber, the sizes of the images of the emission points at the light-condensing position are increased by the magnification power. Nevertheless, the increase in the sizes of the images of the emission points at the light-condensing position is incompatible with the reduction in the core diameter of the optical fiber. Therefore, it is unpreferable to increase the focal length of the condensing lens.

In particular, the magnification power is an unignorable factor in the case where the semiconductor lasers have broad emission areas, although the emission points of the single-mode semiconductor lasers are small.

In addition, when the magnification power increases, higher precision is required in the position adjustment of the semiconductor lasers and the collimator lenses. When the position adjustment is inaccurate, and the laser beams deviate from the core of the optical fiber, loss occurs in the amount of light, so that the output intensity cannot be increased. Further, since the operation for the position adjustment is required to be repeated the number of times corresponding to the number of the semiconductor lasers, the requirement of the high precision in the position adjustment of the semiconductor lasers and the collimator lenses is a serious cost-increasing factor.

In order to increase the output intensity of the combined laser sources in which semiconductor lasers are arranged as mentioned before, it is effective to closely arrange the semiconductor lasers so that the gaps between the semiconductor lasers and between the collimator lenses are as small as possible. However, if the semiconductor lasers and the collimator lenses are too closely arranged, it is impossible to allow sufficient space to mount the semiconductor lasers and the collimator lenses. Therefore, the close arrangement of the semiconductor lasers and the collimator lenses imposes constraints on the constituents per se and adjustment of the constituents. Thus, the close arrangement of the semiconductor lasers and the collimator lenses is disadvantageous in terms of the cost of the components, devices for adjustment, and the man-hours needed for adjustment, and increases the total cost.

In a method which has been proposed for reduction of the man-hours needed for adjustment, a plurality of semiconductor lasers are integrally formed into a semiconductor-laser array, a plurality of collimator lenses are integrally formed into a collimator-lens array, and the positions of the semiconductor-laser array and the collimator-lens array are adjusted when the semiconductor-laser array and the collimator-lens array are mounted. However, the operation of mounting the chips increases man-hours needed for quality assurance. In addition, since the semiconductor-laser array and the collimator-lens array are custom-built, the cost of a high-precision mounting device adapted for the custom-built components is high, so that it is a heavy burden to recover the cost of the mounting device. Therefore, it is almost impossible to reduce the cost by using the above method.

Further, in the conventional combined laser source in which a number of semiconductor-laser chips area arranged on a heat block, the entire combined laser source is required to be sealed, and the yield rate is low, since the entire combined laser source becomes a defective even when only one of the chips or the lenses is defective. Thus, the total cost of the conventional combined laser source is high.

If the conventional semiconductor lasers mounted in a sealed package are used instead of the separate semiconductor-laser chips, the above-mentioned problems of the necessity of sealing or the low yield rate do not occur. However, the sizes of the sealed packages of the conventional semiconductor lasers are large, so that the gaps between the light-emission points of the semiconductor lasers increase, and the amount of light per unit area in a plane in the condensing lens decreases. In addition, the numerical aperture (NA) of the optical fiber is required to be great in order to make the widely spaced laser beams condensed and inputted into the optical fiber. This requirement is contrary to the aforementioned requirement for small numerical aperture.

SUMMARY OF THE INVENTION

The present invention has been developed in view of the above circumstances.

The object of the present invention is to provide a combined laser source which can be produced at low cost and emits a high-intensity laser beam.

In order to accomplish the above object, a combined laser source according to the present invention is provided. The combined laser source according to the present invention comprises: a plurality of semiconductor lasers which contain emission elements emitting a plurality of laser beams and being separately and hermetically sealed; a plurality of collimator lenses which collimate the plurality of laser beams emitted from the emission elements of the plurality of semiconductor lasers; an optical condensing system which receives, condenses, and optically combines the plurality of laser beams collimated by the plurality of collimator lenses; and one or more deflection members which are arranged between the optical condensing system and one or more of the plurality of collimator lenses, and deflect one or more of the plurality of laser beams collimated by the one or more of the plurality of collimator lenses so that the one or more of the plurality of laser beams propagate parallel to an optical axis of the optical condensing system.

Preferably, the combined laser source according to the present invention may also have one or any possible combination of the following additional features (i) to (xii).

(i) The cross sections of the plurality of laser beams which enter the optical condensing system are closely arrayed in one of approximately radial, linear, and matrix-like arrangements in a plane contained in the optical condensing system and perpendicular to the optical axis of the optical condensing system.

Generally, the spread angle of a laser beam emitted from a semiconductor laser in the direction parallel to the active layer of the semiconductor laser is different from the spread angle in the direction perpendicular to the active layer. That is, the cross section of the laser beam is not circular, and has an elliptical shape in many cases. Therefore, in the linear or matrix-like arrangement, the major or minor axes of the cross sections of the laser beams are aligned along a line, or rows and columns of a matrix. In the radial arrangement, the major axes of the cross sections of the laser beams are aligned in radial directions.

(ii) The plurality of semiconductor lasers are arranged so that a major axis of a cross section of one of the plurality of laser beams is different from a major axis of a cross section of another of the plurality of laser beams, each of the one or more deflection members is so positioned and has such a shape that the one or more deflection members do not block the plurality of laser beams, and the plurality of laser beams are arrayed in an approximately radial arrangement in a plane contained in the optical condensing system and perpendicular to the optical axis of the optical condensing system.

(iii) The plurality of semiconductor lasers are groups of two or more semiconductor lasers, each of the groups of two or more semiconductor lasers is apart from other ones of the groups of two or more semiconductor lasers in one or both of a first direction parallel to the optical axis of the optical condensing system and a second direction perpendicular to the first direction, and the cross sections of the plurality of laser beams are arrayed in an approximately matrix-like arrangement in a plane contained in the optical condensing system and perpendicular to the optical axis.

(iv) The plurality of semiconductor lasers are groups of two or more semiconductor lasers arranged at opposite positions on both sides of the optical axis of the optical condensing system, and the plurality of laser beams are arrayed in an approximately matrix-like arrangement in a plane contained in the optical condensing system and perpendicular to the optical axis.

(v) The plurality of semiconductor lasers are groups of two or more semiconductor lasers, the groups are arranged at first positions on a first side of the optical axis and second positions on a second side of the optical axis, the second positions correspond to the first positions, each of the second positions is different from a position opposite to one of the first positions corresponding to the second position with respect to the optical axis, in one or both of a first direction parallel to the optical axis of the optical condensing system and a second direction perpendicular to the first direction, and cross sections of the plurality of laser beams are arrayed in an approximately matrix-like arrangement in a plane contained in the optical condensing system and perpendicular to the optical axis.

(vi) In the combined laser source having the feature (iv) or (v), the plurality of laser beams have identical optical path lengths from the plurality of collimator lenses to the optical condensing system.

(vii) The one or more deflection members deflect the one or more of the plurality of laser beams by a deflection angle of approximately 90 degrees.

(viii) The one or more deflection members may be prisms or mirrors. For example, the one or more deflection members are one or more right-angle prisms each having a face inclined at an inclination angle of approximately 45 degrees.

(ix) In the combined laser source according to the present invention, when a first one of the one or more deflection members blocks a portion of the cross-sectional area within the $1/e^2$ radius of a first one of the plurality of laser beams other than a second one of the plurality of laser beams which the first one of the one or more deflection members deflects, and the portion is equal to or smaller than 20% of the cross-sectional area. The $1/e^2$ radius is the radius at which the intensity of the laser beam is $1/e^2$ of the maximum in the cross-sectional intensity distribution of the laser beam.

(x) Each of the plurality of semiconductor lasers has a hermetically-sealed package structure in which one of the emission elements is covered by a cap having an approximately cylindrical shape and a light-exit window at the top of the cap.

(xi) The emission elements have oscillation wavelengths of 360 to 490 nm.

(xii) The combined laser source according to the present invention may further comprise an optical fiber into which an optically combined laser beam generated by the optical condensing system is inputted, and the optical fiber has a numerical aperture equal to or greater than 0.3.

The present invention has the following advantages.

(a) In the combined laser source according to the present invention, even one or more of the plurality of laser beams are initially emitted in directions different from the direction of the optical axis of the optical condensing system, the one or more of the plurality of laser beams can be inputted into the optical condensing system by using the one or more deflection members as well as one or more other laser beams which are initially emitted in the same direction as the optical axis of the optical condensing system. Therefore, it is possible to increase the number of laser beams which can be optically combined, and therefore greatly increase the intensity of the combined laser beam.

(b) It is unnecessary to change the numerical aperture of the optical fiber or the focal depth of the condensing lens for inputting into the optical fiber the laser beams condensed by the optical condensing system. That is, it is possible to use the optical fiber and the condensing lens in a similar manner to the conventional combined laser sources. Therefore, when the combined laser source according to the present invention is used in an image exposure system, it is possible to expose a sharp image as the conventional combined laser sources without increase in the magnification power of the condensing lens.

(c) The semiconductor lasers in the combined laser source according to the present invention each contain an emission element (semiconductor-laser chip) which is separately and hermetically sealed and emits a laser beam. For example, it is possible to use the commercially available standard semiconductor lasers. In addition, in the combined laser source according to the present invention, the one or more laser beams which are emitted in the directions different from the direction of the optical axis of the optical condensing system can also be collected, and the freedom of mounting of components such as the semiconductor lasers and the collimator lenses is great. For example, the space between components is sufficient for mounting the components. That is, it is possible to reduce the cost of the components per se, and mount the components by using the conventional alignment devices with the conventional mounting precision. Therefore, it is also possible to reduce the manufacturing cost.

(d) According to the present invention, it is possible to dispense with the structure for hermetically sealing the entire module, which is necessary in the conventional combined laser sources. In addition, it is also possible to reduce the man-hours needed for performance assurance during manufacture. Therefore, it is possible to realize a reliable module at greatly reduced cost. In particular, in the case where the oscillation wavelengths of the semiconductor lasers are 360 to 490 nm, the combined laser sources are likely to be affected by air pollution. Thus, the present invention is particularly effective in such a case since the semiconductor lasers used in the combined laser source according to the present invention each contain an emission element which is separately and hermetically sealed.

(e) In the conventional combined laser sources in which a plurality of bare semiconductor-laser chips are contained in a package, when one of the plurality of semiconductor-laser chips deteriorates, the entire module becomes a defective. On the other hand, in the combined laser source according to the present invention, when one of the semiconductor-laser chips (emission elements) deteriorates, it is sufficient to replace the semiconductor laser containing the semiconductor-laser chip. Therefore, the yield rate can be greatly improved, and the manufacturing cost can be greatly reduced.

As explained above, the combined laser source according to the present invention can achieve both of the high intensity and cost reduction. In addition, in the case where the combined laser source according to the present invention has the aforementioned additional features, the combined laser source further has the following advantages.

(f) In the case where the combined laser source according to the present invention has the aforementioned additional feature (i), the optical density of the plurality of laser beams becomes high when the laser beams enter the optical condensing system. In addition, the utilization efficiency of the optical condensing system can be maximized by appropriately arranging the cross sections of the plurality of laser beams which enter the optical condensing system. Therefore, it is possible to increase the amount of light per unit area in (i.e., the intensity of) the combined laser beam.

(g) In the case where the combined laser source according to the present invention has the aforementioned additional feature (iii), (iv), or (v), the plurality of semiconductor lasers can be mounted on a group-by-group basis. Therefore, the operation of mounting the semiconductor lasers is simplified, so that the manufacturing cost can be reduced.

(h) In the case where the combined laser source according to the present invention has the aforementioned additional feature (vi), it is possible to more accurately arrange the cross sections of the plurality of laser beams in a plane contained in the optical condensing system and perpendicular to the optical axis, even when the plurality of laser beams entering the optical condensing system are not sufficiently parallel.

(i) In the case where the combined laser source according to the present invention has the aforementioned additional feature (viii), the cost of the one or more deflection members is low since the right-angle prisms having a 45-degree inclined face are commercially available as standard prisms.

(j) In the case where the combined laser source according to the present invention has the aforementioned additional feature (xii), it is possible to guarantee a sufficient focal depth for exposure of highly fine images, and expose highly sharp images.

BRIEF DESCRIPTION OF THE DRAWINGS

FIG. 3 is a front view of a portion, containing a condensing lens and deflection members, of the combined laser source according to the first embodiment, viewed from the position A-A indicated in FIG. 2A.

FIG. 4 is a perspective view illustrating a structure of a semiconductor laser and the spread of a laser beam outputted from the semiconductor laser.

FIGS. 5A, 5B, 5C, and 5D are schematic front views of a semiconductor-laser chip and a mount in four arrangements in which the orientations of the active layer of the semiconductor-laser chip are different.

FIG. 6A is a diagram schematically showing an arrangement in which right-angle prisms having a triangular cross section are used as the deflection members, and a deflection member located on the forward side does not stand in the optical path of a laser beam located on the rear side.

FIG. 6B is a diagram schematically showing an arrangement in which prisms having a rectangular cross section are used as the deflection members, and a deflection member located on the forward side stands in the optical path of a laser beam located on the rear side.

FIG. 7 is a perspective view of a combined laser source according to a second embodiment of the present invention.

FIGS. 8A and 8B are plan and side views of the combined laser source according to the second embodiment.

FIG. 9 is a perspective view of a combined laser source according to a third embodiment of the present invention.

DESCRIPTION OF PREFERRED EMBODIMENTS

Preferred embodiments of the present invention are explained in detail below with reference to drawings.

First Embodiment

Figure 1:
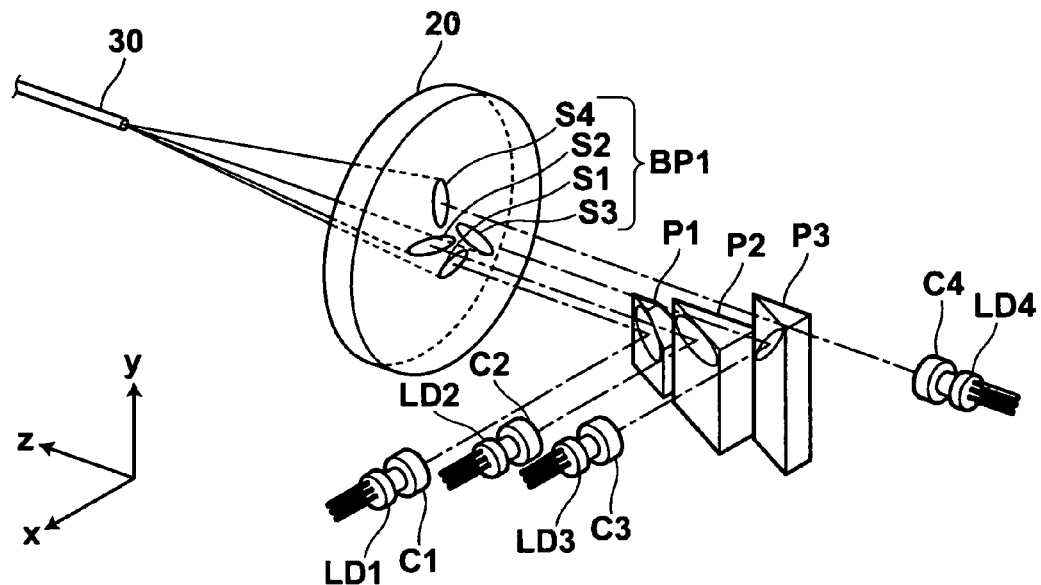
FIG. 1 is a perspective view of a combined laser source according to a first embodiment of the present invention.
Figure 2A:
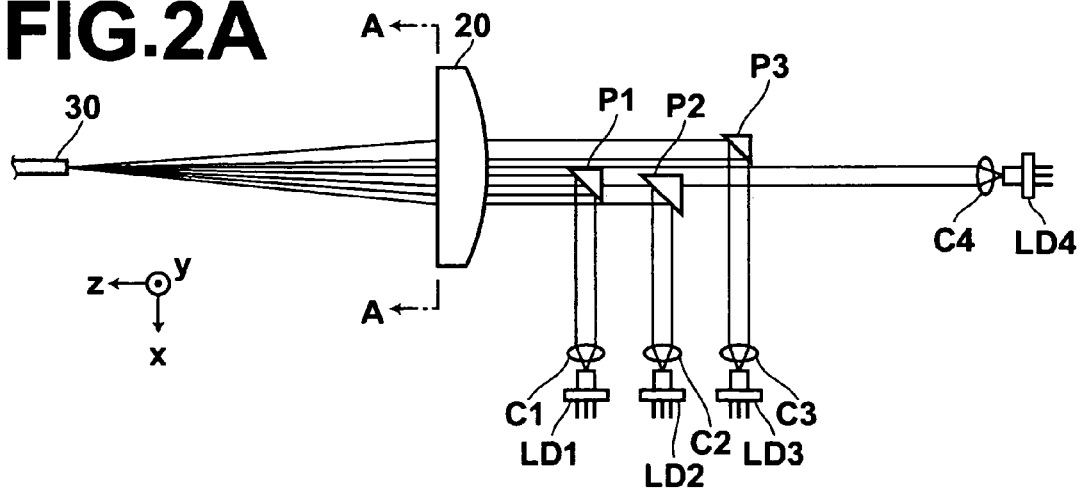
FIGS. 2A and 2B are plan and side views of the combined laser source according to the first embodiment.
Figure 2B:
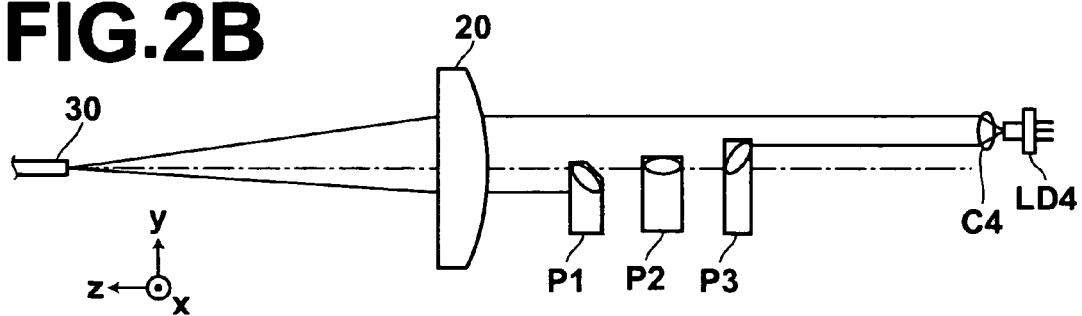

First, a combined laser source according to the first embodiment of the present invention is explained below with reference to FIGS. 1, 2A, 2B, and 3. FIGS. 1, 2A, and 2B are respectively perspective, plan, and side views of the combined laser source according to the first embodiment, and FIG. 3 is a front view of a portion, containing a condensing lens and deflection members, of the combined laser source according to the first embodiment, viewed from the position A-A indicated in FIG. 2A. In FIGS. 1, 2A, and 2B, the z direction corresponds to the direction of the optical axis of the condensing lens, and x and y directions are perpendicular to the z direction. Specifically, FIG. 2A is a view from the y direction, and FIG. 2B is a view from the x direction. In addition, semiconductor lasers and collimator lenses are not shown in FIG. 2B.

The combined laser source according to the first embodiment comprises four semiconductor lasers LD1, LD2, LD3, and LD4, four collimator lenses C1, C2, C3, and C4, three deflection members P1, P2, and P3, a condensing lens 20, and an optical fiber 30.

The four semiconductor lasers LD1, LD2, LD3, and LD4 emit four divergent laser beams. The four collimator lenses C1, C2, C3, and C4 are provided in correspondence with the four semiconductor lasers LD1, LD2, LD3, and LD4 and collimate the four divergent laser beams emitted from the semiconductor lasers LD1, LD2, LD3, and LD4. The deflection members P1, P2, and P3 are provided in correspondence with the semiconductor lasers LD1, LD2, and LD3, and deflect the laser beams collimated by the collimator lenses C1, C2, and C3 so that the laser beams collimated by the collimator lenses C1, C2, and C3 enter the condensing lens 20. The condensing lens 20 condenses the three laser beams deflected by the deflection members P1, P2, and P3 and the laser beam collimated by the collimator lens C4 so that all the laser beams condensed by the condensing lens 20 enter the optical fiber 30.

The four laser beams which enter the condensing lens 20 have cross sections S1, S2, S3, and S4 in a plane contained in the condensing lens 20 and perpendicular to the optical axis of the condensing lens 20, where the cross sections S1, S2, S3, and S4 have approximately elliptical shapes, and form a beam cross-section pattern BP1. The cross sections S1, S2, S3, and S4 are closely located in the above plane so that the cross sections S1, S2, S3, and S4 do not overlap, and the positions of the centers of the cross sections S1, S2, S3, and S4 in the above plane and the directions of the major axes of the cross sections S1, S2, S3, and S4 are different.

In FIG. 1, the shape of the condensing lens 20 is schematically illustrated, the optical axis of the optical path from each of the collimator lenses C1, C2, C3, and C4 to the condensing lens 20 is indicated by a dash-dot line, and a line representing the laser beam from each of the cross sections S1, S2, S3, and S4 to the optical fiber 30 is indicated by a solid and/or dashed line. In addition, in FIGS. 1 and 2B, beam spots formed on reflection faces (explained later) of the deflection members P1, P2, and P3 are also schematically indicated.

The semiconductor lasers LD1, LD2, LD3, and LD4 each contain an emission element having an oscillation wavelength of 405 nm and output power of 50 mW, and the emission element is separately contained and hermetically sealed in a CAN package structure having a diameter of 5.6 mm. FIG. 4 is a perspective view illustrating the structure of each of the semiconductor lasers LD1, LD2, LD3, and LD4 and the spread of the laser beam outputted from the semiconductor laser. As illustrated in FIG. 4, in the CAN package structure, a semiconductor-laser chip 4 (as the above emission element) is fixed to a mount 3, and covered by a cap 2 having an approximately cylindrical shape. The cap 2 has a flange 5 and a light-exit window 1, which is arranged at the top of the cap 2. The flange 5 of the cap 2 is fixed to a stem 6 so that the semiconductor-laser chip 4 is hermetically sealed in the cap 2.

Generally, a laser beam emitted from a semiconductor-laser chip has a smaller spread angle in the direction parallel to the active layer of the semiconductor-laser chip and a greater spread angle in the direction perpendicular to the active layer. The laser beam B emitted from each of the semiconductor lasers LD1, LD2, LD3, and LD4 has a cross section having an elliptical shape as illustrated in FIG. 4.

In order to realize the arrangement of the cross sections S1, S2, S3, and S4 in the aforementioned plane in the condensing lens 20 as illustrated in FIG. 1, the semiconductor lasers LD1, LD2, LD3, and LD4 are arranged so that the directions of the major axes of the cross sections of the emitted laser beams around the optical axes are different. FIGS. 5A, 5B, 5C, and 5D show four different arrangements (orientations) of the semiconductor-laser chip 4 (formed on the mount 3). In the arrangements of FIGS. 5A, 5B, 5C, and 5D, the laser beams are emitted from the semiconductor laser in the directions perpendicular to the plane of FIGS. 5A, 5B, 5C, and 5D, and the constituents of the semiconductor laser other than the mount 3 and the semiconductor-laser chip 4 are not shown. The orientations of the semiconductor-laser chip 4 in the semiconductor laser as illustrated in FIG. 4 around the optical axis of the laser beam emitted from the semiconductor laser can be readily adjusted by rotating the stem 6 of the semiconductor laser by use of a conventional adjustment device.

The semiconductor lasers LD1, LD2, and LD3 are arrayed at intervals of 10 mm in the z direction at a predetermined distance from the optical axis of the condensing lens 20 so that the laser beams are emitted from the semiconductor lasers LD1, LD2, and LD3 in the x direction. The vertical positions (in the y direction) of the emission points of the semiconductor lasers LD1, LD2, and LD3 are respectively identical to the vertical positions of the centers of the cross sections S1, S2, and S3 in the aforementioned plane in the condensing lens 20. The above intervals in the z direction are not limited to 10 mm. It is preferable that the intervals in the z direction be determined so that the operations of mounting and adjusting the semiconductor lasers and the collimator lenses can be easily performed.

The deflection members P1, P2, and P3 and the semiconductor laser LD4 are placed on the backward side of the condensing lens 20 along the optical axis of the condensing lens 20. The semiconductor laser LD4 is placed at a greater distance in the z direction from the condensing lens 20 than the deflection members P1, P2, and P3, and emits a laser beam in the z direction toward the condensing lens 20. The vertical position (in the y direction) of the emission point of the semiconductor laser LD4 is identical to the vertical position of the center of the cross section S4 in the aforementioned plane in the condensing lens 20.

Each of the collimator lenses C1, C2, C3, and C4 has a focal length of 3 mm, a numerical aperture (NA) of 0.6 and an effective diameter of 3.6 mm in a first direction in a plane perpendicular to the optical axis of the collimator lens, and a numerical aperture (NA) of 0.2 and an effective diameter of 1.2 mm in a second direction perpendicular to the first direction. For example, the collimator lenses C1, C2, C3, and C4 may be aspherical lenses. Alternatively, the collimator lenses C1, C2, C3, and C4 may not be designed as above, and may be designed according to the spread angles of the semiconductor lasers so as to have sufficient numerical apertures.

In FIGS. 1 and 2A, the shapes of the collimator lenses C1, C2, C3, and C4 are schematically illustrated, the collimator lenses C1, C2, C3, and C4 are respectively arranged in the vicinities of the light-emission ends of the semiconductor lasers LD1, LD2, LD3, and LD4, and collimate the divergent laser beams emitted from the semiconductor lasers LD1, LD2, LD3, and LD4.

Each of the deflection members P1, P2, and P3 is a right-angle prism having a 45-degree inclined face, and the two isosceles edges (sides) of each (right triangular) base of the prism has a length of 5 mm. The 45-degree inclined face is dielectric (high reflection) coated so as to realize a reflection face, and the edges having the 45-degree edge angle are knife-edged.

The deflection members P1, P2, and P3 are provided for deflecting the laser beams emitted from the semiconductor lasers LD1, LD2, and LD3 in the directions different from the direction of the optical axis of the condensing lens 20 so that the deflected laser beams propagate through closely located optical paths in the direction parallel to the optical axis of the condensing lens 20. Specifically, the deflection members P1, P2, and P3 are arranged on the straight lines being parallel to the optical axis of the condensing lens 20 and passing through the centers of the aforementioned cross sections S1, S2, and S3, respectively, and the reflection faces of the deflection members P1, P2, and P3 form an angle of 45 degrees with the z direction, so that the laser beams emitted from the semiconductor lasers LD1, LD2, and LD3 in the x direction are deflected by the deflection angle of 90 degrees, and the deflected laser beams propagate in the z direction and enter the condensing lens 20. The intervals between the deflection members P1, P2, and P3 in the z direction are 10 mm.

The condensing lens 20 realizes the aforementioned optical condensing system, and condenses the laser beams originating from the semiconductor lasers LD1, LD2, LD3, and LD4. For example, the condensing lens 20 has a focal length of 24 mm, a numerical aperture (NA) of 0.2, and an effective diameter of 10 mm. Although the condensing lens 20 may not be designed as above, the focal length of the condensing lens 20 may be otherwise designed according to the numerical aperture of the optical fiber 30 as long as the aforementioned cross sections S1, S2, S3, and S4 are within the effective diameter of the condensing lens 20. In addition, it is preferable that the condensing lens 20 be designed to have as small a magnification power as possible.

The optical fiber 30 is a multimode optical fiber having a numerical aperture of 0.3. The optical fiber 30 may be a step-index type, a graded-index type, or a composite-type optical fiber. In the composite-type optical fiber, the functions of the step-index type optical fiber and the graded-index type optical fiber are combined.

In the combined laser source having the above construction, the laser beams emitted from the semiconductor lasers LD1, LD2, and LD3 in the x direction are respectively collimated by the collimator lenses C1, C2, and C3, and are then deflected by the deflection members P1, P2, and P3 by the deflection angle of 90 degrees so that the laser beams travel in the z direction and enter the condensing lens 20. In addition, the laser beam emitted from the semiconductor laser LD4 in the z direction is collimated by the collimator lens C4, travels straightly forward, and enters the condensing lens 20. At this time, the laser beams originating from the semiconductor lasers LD1, LD2, LD3, and LD4 and entering the condensing lens 20 form the beam cross-section pattern BP1 in the aforementioned plane in the condensing lens 20 perpendicular to the optical axis of the condensing lens 20, where the beam cross-section pattern BP1 is constituted by the cross sections S1, S2, S3, and S4 which are closely arrayed as illustrated in FIG. 1. Then, the laser beams entering the condensing lens 20 converge on the input-end face of the optical fiber 30, so that the laser beams are optically combined and propagate through the optical fiber 30.

In the combined laser source according to the present embodiment, the semiconductor lasers LD1, LD2, LD3, and LD4 (in the package with the diameter of 5.6 mm) and the collimator lenses C1, C2, C3, and C4 are mounted with sufficient spacing, so that the mounting and adjustment of the semiconductor lasers and the collimator lenses can be easily performed. In addition, the laser beams from the semiconductor lasers LD1, LD2, LD3, and LD4 are brought close together when the laser beams enter the condensing lens 20. Thus, the combined laser source according to the present embodiment can achieve high intensity at low cost.

Further, since each of the semiconductor lasers is separately and hermetically sealed, it is possible to easily replace one of the semiconductor lasers when the semiconductor laser deteriorates. On the other hand, in the conventional combined laser sources in which a plurality of bare semiconductor-laser chips are contained in a package, when one of the plurality of bare semiconductor-laser chips deteriorates, the entire module becomes a defective. Therefore, the present invention greatly improves the yield rate.

Furthermore, it is possible to produce a plurality of units each containing one of the above semiconductor lasers and a corresponding one of the collimator lenses so that each of the units can be individually replaced. Therefore, when one of the semiconductor lasers deteriorates, it is possible to make a replacement on a unit-by-unit basis (i.e., it is unnecessary to replace the entire combined laser source). Thus, in this case, it is also possible to improve the yield rate.

Moreover, it is preferable that the shape, size, and arrangement of each of the deflection members P1, P2, and P3 be designed so that the entire laser beam reflected by the deflection member is incident on the effective area of the condensing lens 20, and the deflection member does not stand in the optical path of any of laser beams which propagate from the rear of the deflection member, as illustrated in FIG. 3. For example, in the embodiment of FIG. 3, the top portion of the deflection member P1 is cut at a bevel according to the major-axis direction and the position of the path of the laser beam deflected by the deflection member P2, so that the deflection member P1 does not block any portion of the laser beam deflected by the deflection member P2 while the deflection member P1 deflects (reflects) the laser beam emitted from the semiconductor laser LD1. In addition, the deflection member P2 has such a height that the deflection member P2 can deflect (reflect) the laser beam emitted from the semiconductor laser LD2, and does not stand in the optical path of the laser beam emitted from the semiconductor laser LD4.

Hereinbelow, the effect of the cross-sectional shapes of the deflection members are explained by using simple examples. FIG. 6A schematically shows an arrangement in which right-angle prisms having a triangular cross section are used as the deflection members. In the arrangement of FIG. 6A, a deflection member located on the forward side does not stand in the optical path of a laser beam deflected by another deflection member located on the rear side, so that it is possible to easily realize closely arranged, elliptical cross sections S5 and S6 of laser beams reflected by the prisms P5 and P6. On the other hand, FIG. 6B schematically shows an arrangement in which prisms having a rectangular cross section are used as the deflection members. That is, the edges of the deflection members on both sides of reflection faces of the deflection members are not knife-edged. When an attempt to closely arrange the laser beams S7 and S8 reflected by the deflection members P7 and P8 (as the laser beams S5 and S6 in FIG. 6A) is made, the cross section S7 of the laser beam reflected by the deflection member P7 located on the forward side has an elliptical shape. However, the portion of the deflection member P7 near the upper edge (in FIG. 6B) blocks a portion of the laser beam reflected by the deflection member P8, so that the cross section S8 of the laser beam reflected by the deflection member P8 located on the rear side has an imperfect elliptical shape which lacks a portion corresponding to the portion of the laser beam blocked by the deflection member P7.

In order to prevent the blocking of the laser beam as above, according to the present embodiment, a portion of each deflection member which blocks at least a portion of a laser beam is removed (e.g., by knife edging) so that the above portion of the laser beam can reach the condensing lens 20. For example, in the case where the deflection (reflection) angle is 90 degrees as in the present embodiment, it is possible to prevent the blocking of the laser beams by shaping each deflection member so as to have an angle of 45 degrees (half of 90 degrees) at the edge on the forward side of the reflection face. In the combined laser source according to the present embodiment, it is possible to use the standard right-angle prisms in which the dimensions of the equal sides of each base are 5 mm.

Nevertheless, in the case where a portion of a laser beam is inevitably blocked by a deflection member, it is preferable that the cross-sectional area of the blocked portion of the laser beam be equal to or greater than 20% of the cross-sectional area of the laser beam within the radius at which the intensity of the laser beam is $1/e^2$ of the peak intensity of the laser beam.

In practice, the above combined laser source can be produced by the process including following steps (1) through (4).

(1) Place the respective components of the combined laser source.

(2) Determine the direction of the major axis of the cross section of the laser beam from each semiconductor laser by rotating the CAN package around the optical axis of the laser beam.

(3) Adjust the position of each collimator lens in the direction of the optical axis of the condensing lens so that the collimator lens collimates the laser beam emitted from the corresponding semiconductor laser, and confirm that the collimated laser beam is incident on an effective area of the corresponding deflection member, and the laser beam deflected by the deflection member is not blocked.

(4) Adjust and fix the positions of each collimator lens in the x and y directions in order to align the optical axis of the laser beam outputted from the collimator lens so that the four laser beams outputted from the four collimator lenses form the aforementioned predetermined beam cross-section pattern BP1 on the aforementioned plane in the condensing lens 20, and converge at a single position after the laser beams pass through the condensing lens 20. Alternatively, the alignment of the optical axes of the laser beams may be achieved by adjustment of the deflection members.

In the combined laser source according to the present invention, it is possible to arbitrarily set the distances from the semiconductor lasers to the deflection members, the distances from the deflection members to the condensing lens, the directions of the major axes of the laser beams emitted from the semiconductor lasers, and the deflection angles in the deflection members so as to form an arbitrary beam cross-section pattern. Hereinbelow, various constructions of the combined laser source according to the present invention are indicated as the second to ninth embodiments with reference to FIGS. 7 to 24B. In FIGS. 7 through 24B, elements and constituents which are equivalent to some elements or constituents in FIGS. 1 through 6B are respectively indicated by the same reference numbers as FIGS. 1 through 6B, and descriptions of the equivalent elements or constituents are not repeated in the following explanations unless necessary.

Second Embodiment

Hereinbelow, a combined laser source according to the second embodiment of the present invention is explained below with reference to FIGS. 7, 8A, and 8B. FIGS. 7, 8A, and 8B are respectively perspective, plan, and side views of the combined laser source according to the second embodiment. In FIGS. 7, 8A, and 8B, the z direction corresponds to the direction of the optical axis of the condensing lens 20, and x and y directions are perpendicular to the z direction. Specifically, FIG. 8A is a view from the y direction, and FIG. 8B is a view from the x direction. In addition, semiconductor lasers and collimator lenses are not shown in FIG. 8B.

The combined laser source according to the second embodiment comprises eight semiconductor lasers LD1 through LD8, eight collimator lenses C1 through C8, eight deflection members P21 through P28, a condensing lens 20, and an optical fiber 30.

The eight semiconductor lasers LD1 through LD8 emit eight divergent laser beams. The eight collimator lenses C1 through C8 are respectively arranged in the vicinities of the light-emission ends of the semiconductor lasers LD1 through LD8, and collimate the divergent laser beams emitted from the semiconductor lasers LD1 through LD8. The eight deflection members P21 through P28 are provided in correspondence with the semiconductor lasers LD1 through LD8, and deflect the eight laser beams collimated by the collimator lenses C1 through C8 so that the eight laser beams collimated by the collimator lenses C1 through C8 enter the condensing lens 20. The condensing lens 20 condenses the eight laser beams deflected by the deflection members P21 through P28 so that the eight laser beams condensed by the condensing lens 20 enter the optical fiber 30.

The eight laser beams which enter the condensing lens 20 respectively have cross sections S1 through S8 in a plane contained in the condensing lens 20 and perpendicular to the optical axis of the condensing lens 20, where the cross sections S1 through S8 have approximately elliptical shapes, and form a radial (petaloid) beam cross-section pattern BP2. In the beam cross-section pattern BP2, the cross sections S1 through S8 are closely located in the above plane so that the cross sections S1 through S8 are arranged around the optical axis of the condensing lens 20 and the directions of the major axes of the cross sections S1 through S8 are aligned in radial directions of the condensing lens 20.

When the eight laser beams having approximately elliptical cross sections are arranged as above, it is possible to minimize the distance from the center to the outermost edge of the beam cross-section pattern BP2. Therefore, when the optical fiber 30, into which the laser beams condensed by the optical condensing system are inputted, has a certain numerical aperture (NA), the above arrangement of the beam cross-section pattern BP2 enables the optical condensing system to have a small magnification power.

In FIG. 7, the shape of the condensing lens 20 is schematically illustrated, the optical axis of the optical path from each of the collimator lenses C1 through C8 to the condensing lens 20 is indicated by a dash-dot line, and a line representing the laser beam from each of the cross sections S1 through S8 to the optical fiber 30 is indicated by a solid and/or dashed line. In addition, in FIGS. 7 and 8B, beam spots formed on reflection faces (explained later) of the deflection members P21 through P28 are also schematically indicated.

Each of the semiconductor lasers LD1 through LD8 has a similar construction to each of the semiconductor lasers LD1 through LD4 in the first embodiment, and each of the collimator lenses C1 through C8 is similar to each of the collimator lenses C1 through C4 in the first embodiment.

The semiconductor lasers LD1 through LD8 are arranged on one side of the optical axis of the condensing lens 20 at adjustable intervals in the z direction so that the laser beams are emitted from the semiconductor lasers LD1 through LD8 in the x direction. The vertical positions (in the y direction) of the emission points of the semiconductor lasers LD1 through LD8 are respectively identical to the vertical positions of the centers of the cross sections S1 through S8 in the aforementioned plane in the condensing lens 20.

The semiconductor lasers LD1 through LD8 are arranged in such a manner that the directions of the major axes of the cross sections of the emitted laser beams around the optical axes are set so as to realize the arrangement of the cross sections S1 through S8 in the aforementioned plane in the condensing lens 20 as illustrated in FIG. 7. That is, the directions of the major axes of the cross sections of the emitted laser beams around the optical axes are not identical.

Each of the deflection members P21 through P28 has a similar function to each of the deflection members P2 and P3 in the first embodiment. The deflection members P21 through P28 are right-angle prisms having a 45-degree inclined face. The 45-degree inclined face is dielectric (high reflection) coated so as to realize a reflection face, and the edges having the 45-degree edge angle are knife-edged. The 45-degree inclined face of each of the deflection members P21 through P28 has such a size that the entire cross section of the corresponding laser beam can be reflected by the 45-degree inclined face.

Similarly to the deflection members P1, P2, and P3 in the first embodiment, the deflection members P21 through P28 are respectively arranged at the intersections of the laser beams emitted from the corresponding semiconductor lasers and the corresponding straight lines being parallel to the optical axis of the condensing lens 20 and passing through the effective area of the condensing lens 20, and the reflection faces of the deflection members P21 through P28 form an angle of 45 degrees with the z direction, so that the laser beams emitted from the semiconductor lasers LD1 through LD8 in the x direction are deflected by the deflection angle of 90 degrees, and the deflected laser beams propagate in the z direction and form the beam cross-section pattern BP2 in the condensing lens 20. In addition, the shape, size, and arrangement of each of the deflection members P21 through P28 are designed so that the entire laser beam reflected by the deflection member is incident on the effective area of the condensing lens 20, and the deflection member does not stand in the optical path of any of laser beams which are deflected by other deflection members.

Although the deflection members P21 through P28 are arranged on one side of the optical axis of the condensing lens 20 in the above embodiment, alternatively, it is possible to arrange the deflection members P21 through P28 on the opposite side or both sides of the optical axis of the condensing lens 20.

Third Embodiment

Figure 10A:
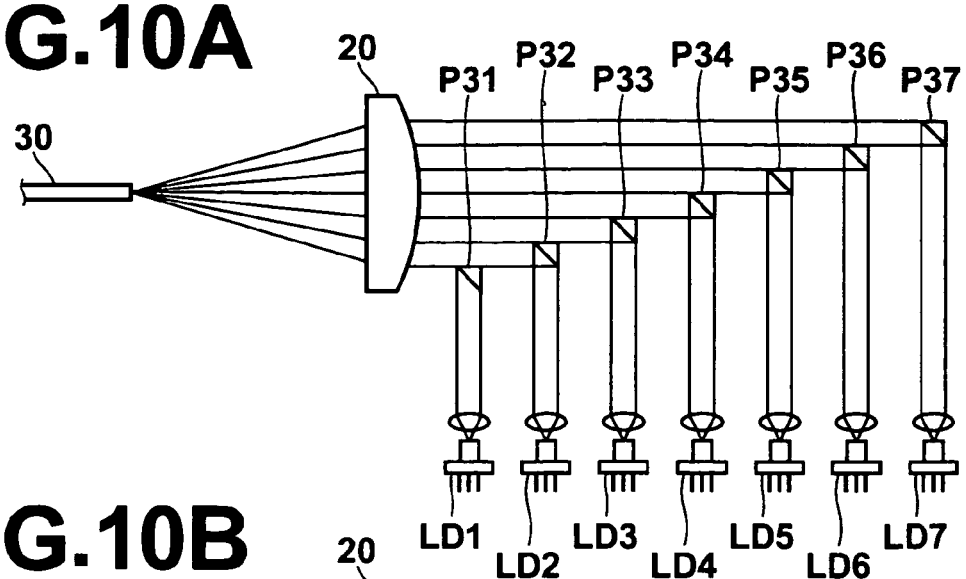
FIGS. 10A and 10B are plan and side views of the combined laser source according to the third embodiment.
Figure 10B:
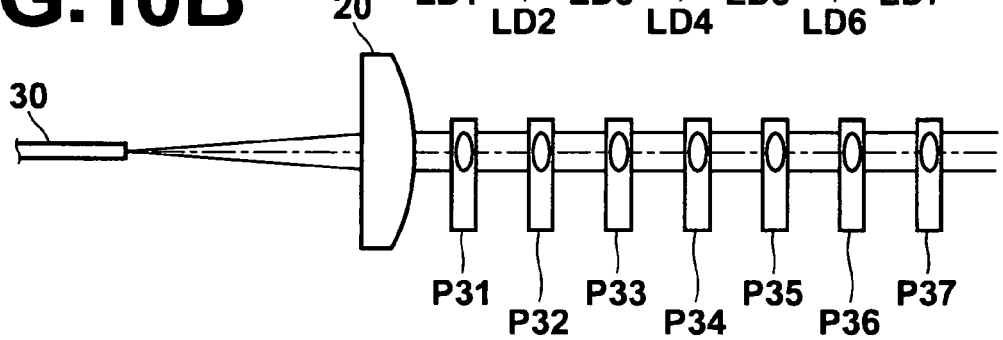

Hereinbelow, a combined laser source according to the third embodiment of the present invention is explained below with reference to FIGS. 9, 10A, and 10B. FIGS. 9, 10A, and 10B are respectively perspective, plan, and side views of the combined laser source according to the third embodiment. In FIGS. 9, 10A, and 10B, the z direction corresponds to the direction of the optical axis of the condensing lens 20, and x and y directions are perpendicular to the z direction. Specifically, FIG. 10A is a view from the y direction, and FIG. 10B is a view from the x direction. In addition, semiconductor lasers and collimator lenses are not shown in FIG. 10B.

The combined laser source according to the third embodiment comprises seven semiconductor lasers LD1 through LD7, seven collimator lenses C1 through C7, seven deflection members P31 through P37, a condensing lens 20, and an optical fiber 30.

The seven semiconductor lasers LD1 through LD7 emit seven divergent laser beams. The seven collimator lenses C1 through C7 are respectively arranged in the vicinities of the light-emission ends of the semiconductor lasers LD1 through LD7, and collimate the divergent laser beams emitted from the semiconductor lasers LD1 through LD7. The seven deflection members P31 through P37 are provided in correspondence with the semiconductor lasers LD1 through LD7, and deflect the seven laser beams collimated by the collimator lenses C1 through C7 so that the seven laser beams collimated by the collimator lenses C1 through C7 enter the condensing lens 20. The condensing lens 20 condenses the seven laser beams deflected by the deflection members P31 through P37 so that the seven laser beams condensed by the condensing lens 20 enter the optical fiber 30.

Figure 25:
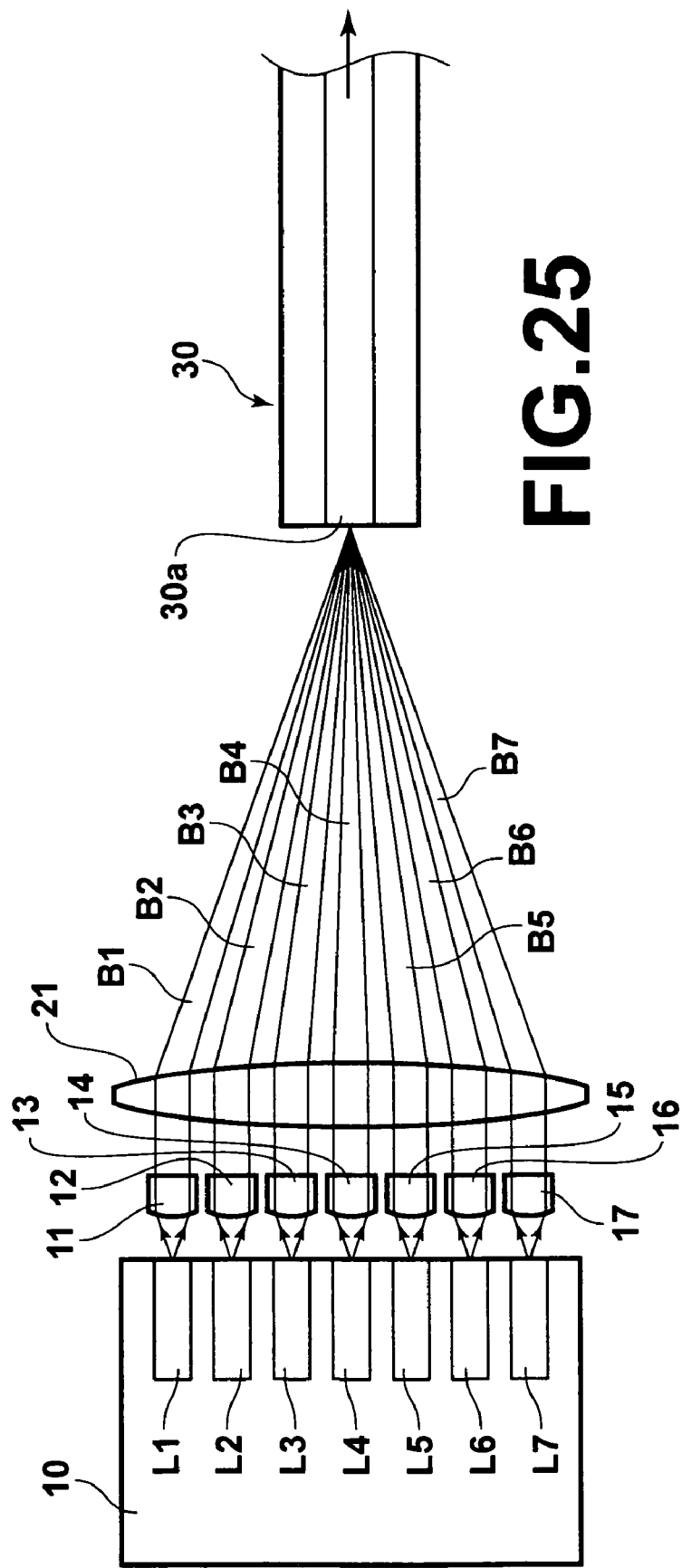
FIG. 25 is a plan view of an example of a conventional combined laser source.

The seven laser beams which enter the condensing lens 20 respectively have approximately elliptical cross sections in a plane contained in the condensing lens 20 and perpendicular to the optical axis of the condensing lens 20, where the major axes of the cross sections are aligned along an identical direction in the above plane. The above cross sections of the seven laser beams are contiguously arrayed along a line perpendicular to the above direction of the major axes of the cross sections, and form a linear beam cross-section pattern BP3. Although the cross sections of the laser beams incident on the condensing lens in the conventional combined laser source illustrated in FIG. 25 are also arrayed along a line, the laser beams incident on the condensing lens in the combined laser source according to the third embodiment can be arranged more closely than in the conventional combined laser source.

In FIG. 9, the shape of the condensing lens 20 is schematically illustrated, the optical axis of the optical path from each of the collimator lenses C1 through C7 to the condensing lens 20 is indicated by a dash-dot line, and a line representing the laser beam from each of the aforementioned cross sections to the optical fiber 30 is indicated by a solid and/or dashed line. In addition, in FIGS. 9 and 10B, beam spots formed on reflection faces (explained later) of the deflection members P31 through P37 are also schematically indicated.

Figure 11:
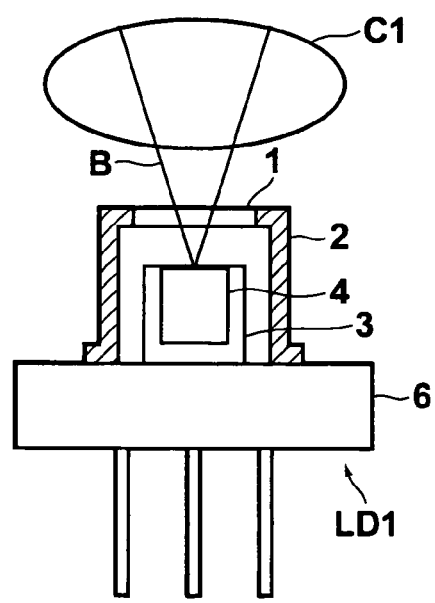
FIG. 11 is a partially cutaway plan view of the semiconductor laser LD1 and the collimator lens C1 in the combined laser source according to the third embodiment.

In order to realize the above linear beam cross-section pattern BP3, the orientations of the semiconductor lasers LD1 through LD7 around the optical axes of the semiconductor lasers are adjusted so that the active layers of the semiconductor lasers are parallel to the z direction. FIG. 11 schematically indicates the spread angle, in the z direction, of the laser beam B emitted from the semiconductor laser LD1 (as a representative of the semiconductor lasers LD1 to LD7). FIG. 11 is a partially cutaway plan view (viewed from the y direction, i.e., from the same direction as FIG. 10A) of the semiconductor laser LD1 and the collimator lens C1 in the combined laser source according to the third embodiment. In FIG. 11, the cap 2 is cut away for showing the inside of the semiconductor laser LD1. As illustrated in FIG. 11, the direction in which the spread angle of the laser beam B is small (i.e., the direction of the active layer of the semiconductor laser LD1) is parallel to the z direction.

The semiconductor lasers LD1 through LD7 are arranged on one side of the optical axis of the condensing lens 20 at adjustable intervals in the z direction so that the laser beams are emitted from the semiconductor lasers LD1 through LD7 in the x direction. The vertical positions (in the y direction) of the emission points of the semiconductor lasers LD1 through LD7 are identical to the vertical positions of the centers of the aforementioned cross sections in the plane in the condensing lens 20.

Each of the deflection members P31 through P37 has a similar function to each of the deflection members P2 and P3 in the first embodiment. The deflection members P31 through P37 are right-angle prisms having a 45-degree inclined face. The 45-degree inclined face is dielectric (high reflection) coated so as to realize a reflection face, and the edges having the 45-degree edge angle are knife-edged. The 45-degree inclined face of each of the deflection members P31 through P37 has such a size that the entire cross section of the corresponding laser beam can be reflected by the 45-degree inclined face.

Similarly to the deflection members P1, P2, and P3 in the first embodiment, the deflection members P31 through P37 are respectively arranged at the intersections of the laser beams emitted from the corresponding semiconductor lasers and the corresponding straight lines being parallel to the optical axis of the condensing lens 20 and passing through the effective area of the condensing lens 20, and the reflection faces of the deflection members P31 through P37 form an angle of 45 degrees with the z direction, so that the laser beams emitted from the semiconductor lasers LD1 through LD7 in the x direction are deflected by the deflection angle of 90 degrees, and the deflected laser beams propagate in the z direction and form the beam cross-section pattern BP3 in the condensing lens 20. In addition, the shape, size, and arrangement of each of the deflection members P31 through P37 are designed so that the entire laser beam reflected by the deflection member is incident on the effective area of the condensing lens 20, and the deflection member does not stand in the optical path of any of laser beams which propagate from the rear of the deflection member.

Fourth Embodiment

Figure 12:
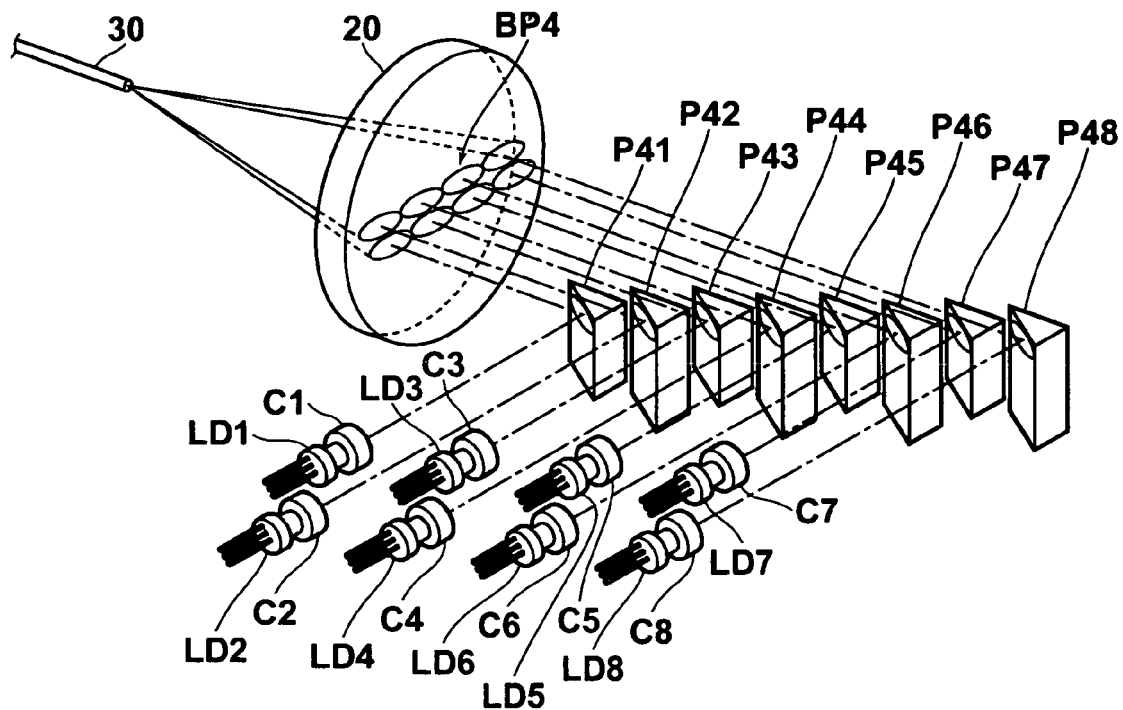
FIG. 12 is a perspective view of a combined laser source according to a fourth embodiment of the present invention.
Figure 13A:
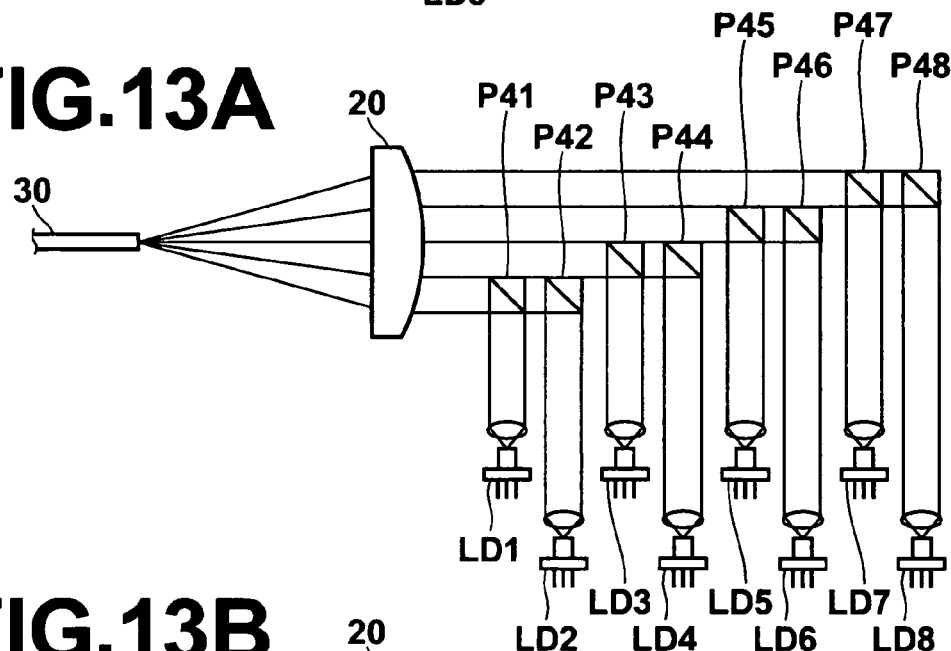
FIGS. 13A and 13B are plan and side views of the combined laser source according to the fourth embodiment.
Figure 13B:
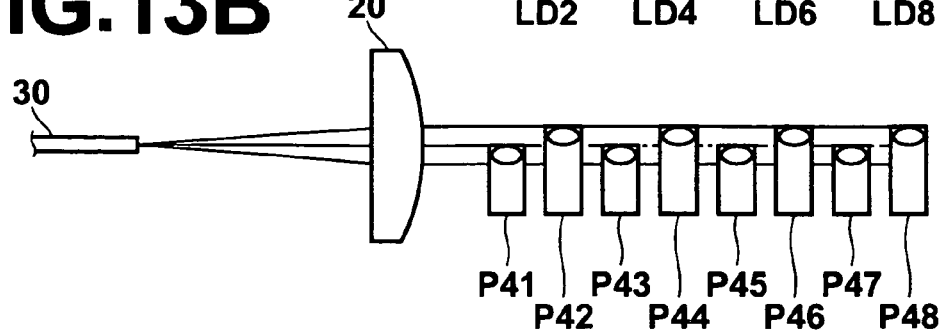

Hereinbelow, a combined laser source according to the fourth embodiment of the present invention is explained below with reference to FIGS. 12, 13A, and 13B. FIGS. 12, 13A, and 13B are respectively perspective, plan, and side views of the combined laser source according to the fourth embodiment. In FIGS. 12, 13A, and 13B, the z direction corresponds to the direction of the optical axis of the condensing lens 20, and x and y directions are perpendicular to the z direction. Specifically, FIG. 13A is a view from the y direction, and FIG. 13B is a view from the x direction. In addition, semiconductor lasers and collimator lenses are not shown in FIG. 13B.

The combined laser source according to the fourth embodiment comprises eight semiconductor lasers LD1 through LD8, eight collimator lenses C1 through C8, eight deflection members P41 through P48, a condensing lens 20, and an optical fiber 30.

The eight semiconductor lasers LD1 through LD8 emit eight divergent laser beams. The eight collimator lenses C1 through C8 are respectively arranged in the vicinities of the light-emission ends of the semiconductor lasers LD1 through LD8, and collimate the divergent laser beams emitted from the semiconductor lasers LD1 through LD8. The eight deflection members P41 through P48 are provided in correspondence with the semiconductor lasers LD1 through LD8, and deflect the eight laser beams collimated by the collimator lenses C1 through C8 so that the eight laser beams collimated by the collimator lenses C1 through C8 enter the condensing lens 20. The condensing lens 20 condenses the eight laser beams deflected by the deflection members P41 through P48 so that the eight laser beams condensed by the condensing lens 20 enter the optical fiber 30.

The eight laser beams which enter the condensing lens 20 respectively have approximately elliptical cross sections in a plane contained in the condensing lens 20 and perpendicular to the optical axis of the condensing lens 20. The elliptical cross sections are contiguously arranged in upper and lower rows (approximately along the x and y directions) as illustrated in FIG. 12, where the major axes of the cross sections are aligned along the direction of the upper and lower rows (approximately parallel to the x direction). That is, a beam cross-section pattern BP4 of the 2×4 beam cross sections is formed in the plane contained in the condensing lens 20 and perpendicular to the optical axis of the condensing lens 20.

In FIG. 12, the shape of the condensing lens 20 is schematically illustrated, the optical axis of the optical path from each of the collimator lenses C1 through C8 to the condensing lens 20 is indicated by a dash-dot line, and a line representing the laser beam from each of the aforementioned cross sections to the optical fiber 30 is indicated by a solid and/or dashed line. In addition, in FIGS. 12 and 13B, beam spots formed on reflection faces (explained later) of the deflection members P41 through P48 are also schematically indicated.

Figure 14:
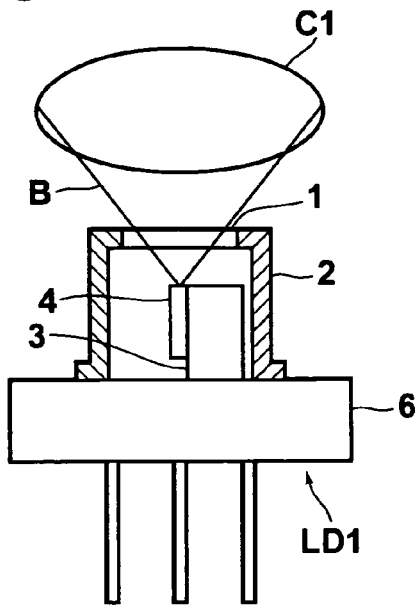
FIG. 14 is a partially cutaway plan view of the semiconductor laser LD1 and the collimator lens C1 in the combined laser source according to the fourth embodiment.

In order to realize the above beam cross-section pattern BP4, the orientations of the semiconductor lasers LD1 through LD8 around the optical axes of the semiconductor lasers are adjusted so that the active layers of the semiconductor lasers are parallel to the y direction. FIG. 14 schematically indicates the spread angle, in the z direction, of the laser beam B emitted from the semiconductor laser LD1 (as a representative of the semiconductor lasers LD1 to LD8). FIG. 14 is a partially cutaway plan view (viewed from the y direction, i.e., from the same direction as FIG. 13A) of the semiconductor laser LD1 and the collimator lens C1 in the combined laser source according to the fourth embodiment. In FIG. 14, the cap 2 is cut away for showing the inside of the semiconductor laser LD1. As illustrated in FIG. 14, the direction in which the spread angle of the laser beam B is large is parallel to the z direction, i.e., the direction of the active layer of the semiconductor laser LD1 is parallel to the y direction.

The semiconductor lasers LD1 through LD8 are arranged on one side of the optical axis of the condensing lens 20 at adjustable intervals so that the laser beams are emitted from the semiconductor lasers LD1 through LD8 in the x direction. The vertical positions (in the y direction) of the emission points of the semiconductor lasers LD1 through LD8 are respectively identical to the vertical positions of the centers of the corresponding ones of the aforementioned cross sections in the plane in the condensing lens 20.

The semiconductor lasers LD1 to LD8 are divided into a first group of the four semiconductor lasers LD1, LD3, LD5, and LD7 and a second group of the four semiconductor lasers LD2, LD4, LD6, and LD8. The positions of the semiconductor lasers LD2, LD4, LD6, and LD8 in the second group are respectively different in the y and z directions from the positions of the corresponding ones of the semiconductor lasers LD1, LD3, LD5, and LD7 in the first group. The mounting of the semiconductor lasers LD1 to LD8 can be facilitated by producing in advance a plurality of units each containing four semiconductor lasers which can be used as either of the first and second groups of semiconductor lasers, and placing a first one of the units at a first position realizing the arrangement of the semiconductor lasers LD1, LD3, LD5, and LD7 and a second one of the units at a second position realizing the arrangement of the semiconductor lasers LD2, LD4, LD6, and LD8, where the second position is different from the first position in the y and z directions.

Each of the deflection members P41 through P48 has a similar function to each of the deflection members P2 and P3 in the first embodiment. The deflection members P41 through P48 are right-angle prisms having a 45-degree inclined face. The 45-degree inclined face is dielectric (high reflection) coated so as to realize a reflection face, and the edges having the 45-degree edge angle are knife-edged. The 45-degree inclined face of each of the deflection members P41 through P48 has such a size that the entire cross section of the corresponding laser beam can be reflected by the 45-degree inclined face.

Similarly to the deflection members P1, P2, and P3 in the first embodiment, the deflection members P41 through P48 are respectively arranged at the intersections of the laser beams emitted from the corresponding semiconductor lasers and the corresponding straight lines being parallel to the optical axis of the condensing lens 20 and passing through the effective area of the condensing lens 20, and the reflection faces of the deflection members P41 through P48 form an angle of 45 degrees with the z direction, so that the laser beams emitted from the semiconductor lasers LD1 through LD8 in the x direction are deflected by the deflection angle of 90 degrees, and the deflected laser beams propagate in the z direction and form the beam cross-section pattern BP4 in the condensing lens 20. In addition, the shape, size, and arrangement of each of the deflection members P41 through P48 are designed so that the entire laser beam reflected by the deflection member is incident on the effective area of the condensing lens 20, and the deflection member does not stand in the optical path of any of laser beams which propagate from the rear of the deflection member.

Fifth Embodiment

Figure 15:
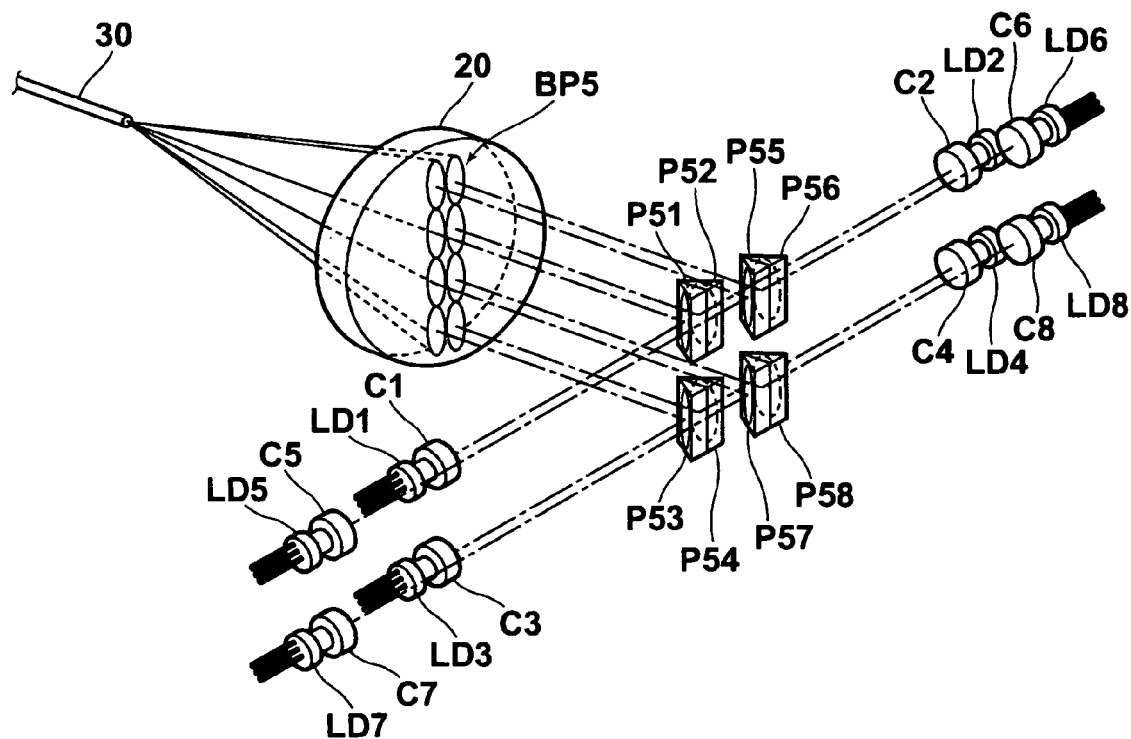
FIG. 15 is a perspective view of a combined laser source according to a fifth embodiment of the present invention.
Figure 16A:
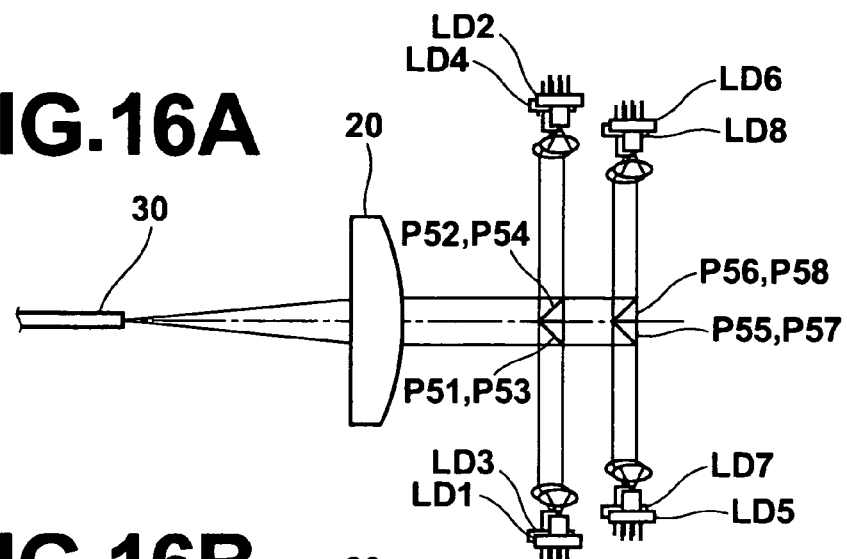
FIGS. 16A and 16B are plan and side views of the combined laser source according to the fifth embodiment.
Figure 16B:
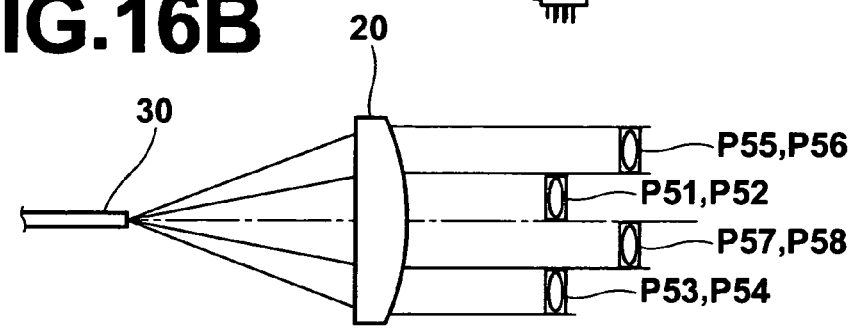

Hereinbelow, a combined laser source according to the fifth embodiment of the present invention is explained below with reference to FIGS. 15, 16A, and 16B. FIGS. 15, 16A, and 16B are respectively perspective, plan, and side views of the combined laser source according to the fifth embodiment. In FIGS. 15, 16A, and 16B, the z direction corresponds to the direction of the optical axis of the condensing lens 20, and x and y directions are perpendicular to the z direction. Specifically, FIG. 16A is a view from the y direction, and FIG. 16B is a view from the x direction. In addition, semiconductor lasers and collimator lenses are not shown in FIG. 16B.

The combined laser source according to the fifth embodiment comprises eight semiconductor lasers LD1 through LD8, eight collimator lenses C1 through C8, eight deflection members P51 through P58, a condensing lens 20, and an optical fiber 30.

The eight semiconductor lasers LD1 through LD8 emit eight divergent laser beams. The eight collimator lenses C1 through C8 are respectively arranged in the vicinities of the light-emission ends of the semiconductor lasers LD1 through LD8, and collimate the divergent laser beams emitted from the semiconductor lasers LD1 through LD8. The eight deflection members P51 through P58 are provided in correspondence with the semiconductor lasers LD1 through LD8, and deflect the eight laser beams collimated by the collimator lenses C1 through C8 so that the eight laser beams collimated by the collimator lenses C1 through C8 enter the condensing lens 20. The condensing lens 20 condenses the eight laser beams deflected by the deflection members P51 through P58 so that the eight laser beams condensed by the condensing lens 20 enter the optical fiber 30.

The eight laser beams which enter the condensing lens 20 respectively have approximately elliptical cross sections in a plane contained in the condensing lens 20 and perpendicular to the optical axis of the condensing lens 20. The elliptical cross sections are contiguously arranged in two vertical rows (approximately along the x and y directions) as illustrated in FIG. 15, where the major axes of the cross sections are aligned along the direction of the two vertical rows (approximately parallel to the y direction). That is, a beam cross-section pattern BP5 of the 4×2 beam cross sections is formed in the plane contained in the condensing lens 20 and perpendicular to the optical axis of the condensing lens 20.

In FIG. 15, the shape of the condensing lens 20 is schematically illustrated, the optical axis of the optical path from each of the collimator lenses C1 through C8 to the condensing lens 20 is indicated by a dash-dot line, and a line representing the laser beam from each of the aforementioned cross sections to the optical fiber 30 is indicated by a solid and/or dashed line. In addition, in FIGS. 15 and 16B, beam spots formed on reflection faces (explained later) of the deflection members P51 through P58 are also schematically indicated.

The orientations of the semiconductor lasers LD1 through LD8 around the optical axes of the semiconductor lasers in the combined laser source according to the fifth embodiment are the same as the orientations of the semiconductor lasers LD1 through LD8 around the optical axes of the semiconductor lasers in the combined laser source according to the third embodiment. That is, the orientations of the semiconductor lasers LD1 through LD8 around the optical axes of the semiconductor lasers are as illustrated in FIG. 11.

The semiconductor lasers LD1 to LD8 are divided into a first group of the four semiconductor lasers LD1, LD3, LD5, and LD7 and a second group of the four semiconductor lasers LD2, LD4, LD6, and LD8. The four semiconductor lasers LD1, LD3, LD5, and LD7 in the first group are arranged on one side of the optical axis of the condensing lens 20 at adjustable intervals so that the laser beams are emitted from the semiconductor lasers LD1, LD3, LD5, and LD7 in the x direction. The vertical positions (in the y direction) of the emission points of the semiconductor lasers LD1, LD3, LD5, and LD7 are respectively identical to the vertical positions of the centers of the corresponding ones of the aforementioned cross sections in the plane in the condensing lens 20.

The four semiconductor lasers LD2, LD4, LD6, and LD8 in the second group are respectively arranged at the positions opposite to the four semiconductor lasers LD1, LD3, LD5, and LD7 with respect to the optical axis of the condensing lens 20 so that the laser beams are emitted from the semiconductor lasers LD2, LD4, LD6, and LD8 in the x direction. The vertical positions (in the y direction) of the emission points of the semiconductor lasers LD2, LD4, LD6, and LD8 are respectively identical to the vertical positions of the centers of the corresponding ones of the aforementioned cross sections in the plane in the condensing lens 20. That is, the four semiconductor lasers LD1, LD3, LD6, and LD7 in the first group and the four semiconductor lasers LD2, LD4, LD6, and LD8 in the second group are placed at the symmetric positions with respect to the y-z plane containing the optical axis of the condensing lens 20, so that the combined laser source according to the fifth embodiment can be compactly constructed. As illustrated in FIGS. 15 and 16B, the semiconductor lasers LD3 and LD4 are respectively arranged right under the corresponding semiconductor lasers LD1 and LD2, and the semiconductor lasers LD7 and LD8 are respectively arranged right under the corresponding semiconductor lasers LD5 and LD6, although the semiconductor lasers LD1, LD2, LD5, and LD6 are respectively illustrated in the positions slightly shifted from the positions of the corresponding semiconductor lasers LD3, LD4, LD7, and LD8 in FIG. 16A only for illustration purpose.

The optical path lengths of the eight parallel laser beams from the collimator lenses C1 through C8 to the condensing lens 20 are identical. Therefore, even when the parallelism between the eight laser beams are not so high, it is possible to suppress inaccuracy in the aforementioned beam cross-section pattern BP5.

Each of the deflection members P51 through P58 has a similar function to each of the deflection members P2 and P3 in the first embodiment. The deflection members P51 through P58 are right-angle prisms having a 45-degree inclined face. The 45-degree inclined face is dielectric (high reflection) coated so as to realize a reflection face, and the edges having the 45-degree edge angle are knife-edged. The 45-degree inclined face of each of the deflection members P51 through P58 has such a size that the entire cross section of the corresponding laser beam can be reflected by the 45-degree inclined face.

Similarly to the deflection members P1, P2, and P3 in the first embodiment, the deflection members P51 through P58 are respectively arranged at the intersections of the laser beams emitted from the corresponding semiconductor lasers and the corresponding straight lines being parallel to the optical axis of the condensing lens 20 and passing through the effective area of the condensing lens 20, and the reflection faces of the deflection members P51 through P58 form an angle of 45 degrees with the z direction, so that the laser beams emitted from the semiconductor lasers LD1 through LD8 in the x direction are deflected by the deflection angle of 90 degrees, and the deflected laser beams propagate in the z direction and form the beam cross-section pattern BP5 in the condensing lens 20. In addition, the shape, size, and arrangement of each of the deflection members PS1 through P58 are designed so that the entire laser beam reflected by the deflection member is incident on the effective area of the condensing lens 20, and the deflection member does not stand in the optical path of any of laser beams which propagate from the rear of the deflection member.

Sixth Embodiment

Figure 17:
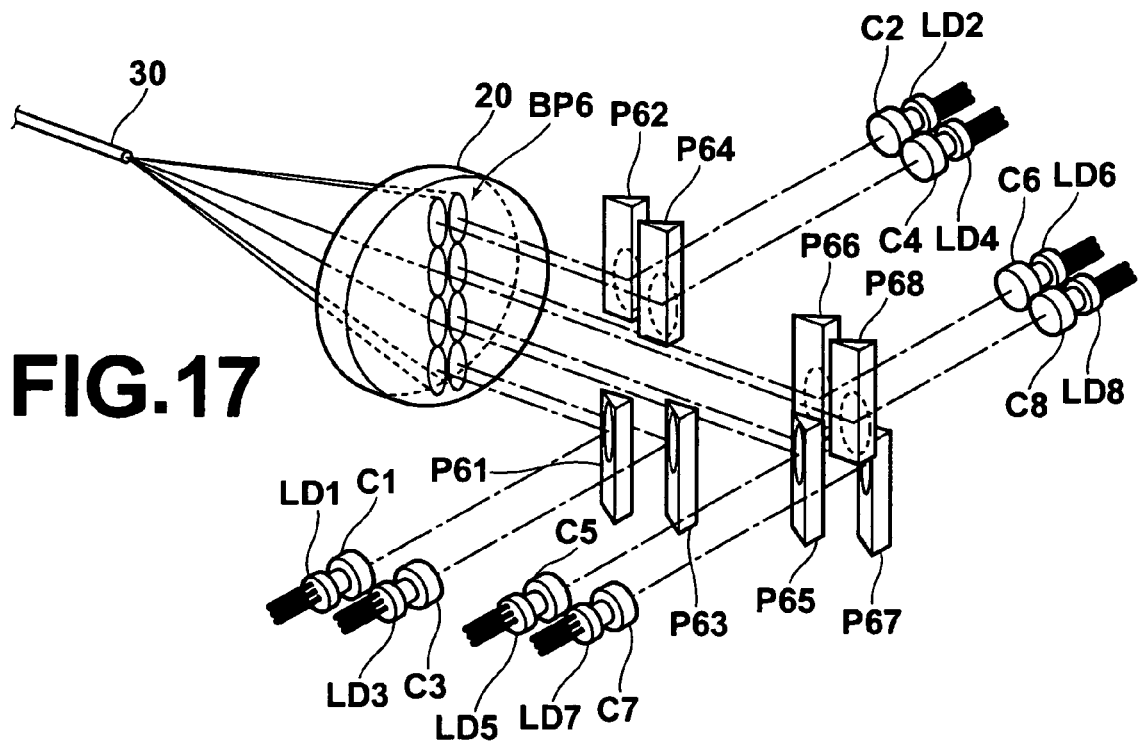
FIG. 17 is a perspective view of a combined laser source according to a sixth embodiment of the present invention.
Figure 18A:
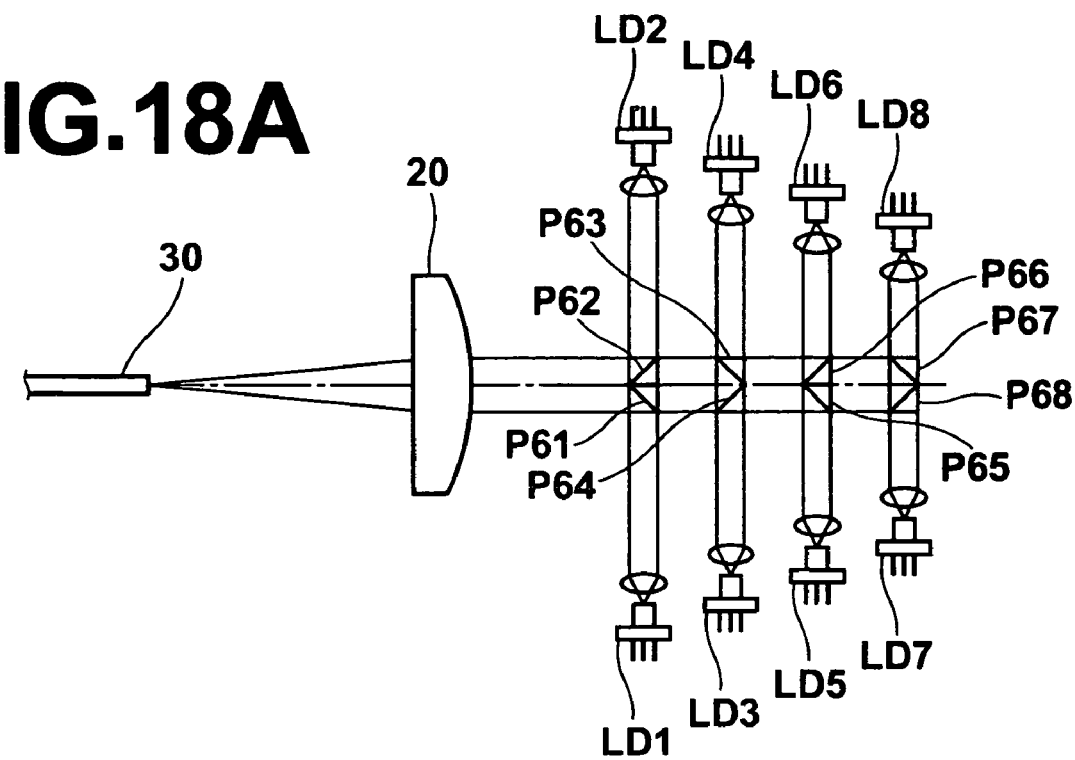
FIGS. 18A and 18B are plan and side views of the combined laser source according to the sixth embodiment.
Figure 18B:
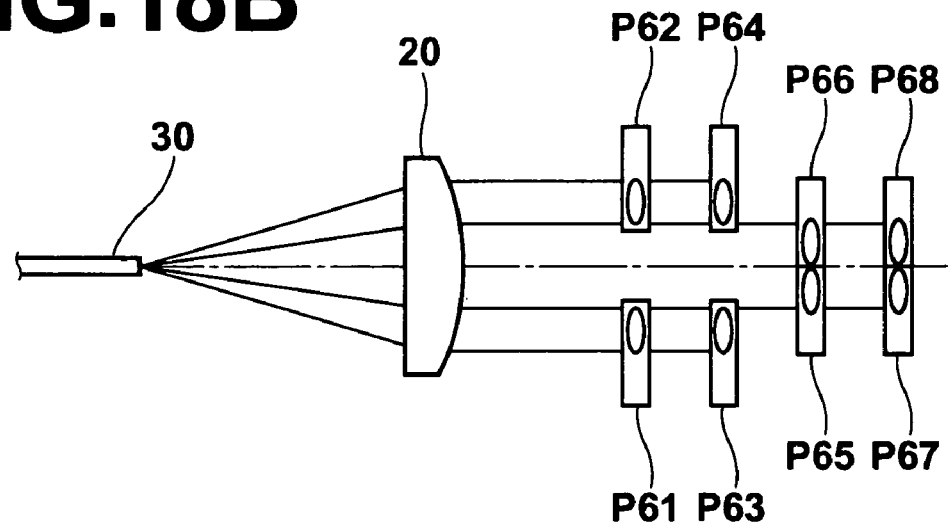

Hereinbelow, a combined laser source according to the sixth embodiment of the present invention is explained below with reference to FIGS. 17, 18A, and 18B. FIGS. 17, 18A, and 18B are respectively perspective, plan, and side views of the combined laser source according to the sixth embodiment. In FIGS. 17, 18A, and 18B, the z direction corresponds to the direction of the optical axis of the condensing lens 20, and x and y directions are perpendicular to the z direction. Specifically, FIG. 18A is a view from the y direction, and FIG. 18B is a view from the x direction. In addition, semiconductor lasers and collimator lenses are not shown in FIG. 18B.

The combined laser source according to the sixth embodiment comprises eight semiconductor lasers LD1 through LD8, eight collimator lenses C1 through C8, eight deflection members P61 through P68, a condensing lens 20, and an optical fiber 30.

The eight semiconductor lasers LD1 through LD8 emit eight divergent laser beams. The eight collimator lenses C1 through C8 are respectively arranged in the vicinities of the light-emission ends of the semiconductor lasers LD1 through LD8, and collimate the divergent laser beams emitted from the semiconductor lasers LD1 through LD8. The eight deflection members P61 through P68 are provided in correspondence with the semiconductor lasers LD1 through LD8, and deflect the eight laser beams collimated by the collimator lenses C1 through C8 so that the eight laser beams collimated by the collimator lenses C1 through C8 enter the condensing lens 20. The condensing lens 20 condenses the eight laser beams deflected by the deflection members P61 through P68 so that the eight laser beams condensed by the condensing lens 20 enter the optical fiber 30.

The eight laser beams which enter the condensing lens 20 respectively have approximately elliptical cross sections in a plane contained in the condensing lens 20 and perpendicular to the optical axis of the condensing lens 20. The elliptical cross sections are contiguously arranged in two vertical rows (approximately along the x and y directions) as illustrated in FIG. 17, where the major axes of the cross sections are aligned along the direction of the two vertical rows (approximately parallel to the y direction). That is, a beam cross-section pattern BP6 of the 4×2 beam cross sections is formed in the plane contained in the condensing lens 20 and perpendicular to the optical axis of the condensing lens 20. Although the beam cross-section pattern BP6 in the sixth embodiment is identical to the beam cross-section pattern BP5 in the fifth embodiment, the arrangement of the semiconductor laser elements LD1 to LD8 and the deflection members P61 through P68 is different from the fifth embodiment.

In FIG. 17, the shape of the condensing lens 20 is schematically illustrated, the optical axis of the optical path from each of the collimator lenses C1 through C8 to the condensing lens 20 is indicated by a dash-dot line, and a line representing the laser beam from each of the aforementioned cross sections to the optical fiber 30 is indicated by a solid and/or dashed line. In addition, in FIGS. 17 and 18B, beam spots formed on reflection faces (explained later) of the deflection members P61 through P68 are also schematically indicated.

The four semiconductor lasers LD1, LD3, LD5, and LD7 are arranged on one side of the optical axis of the condensing lens 20 at adjustable intervals, and the four semiconductor lasers LD2, LD4, LD6, and LD8 are arranged on the opposite side of the optical axis of the condensing lens 20 at adjustable intervals. The vertical positions (in the y direction) of the emission points of the semiconductor lasers LD1 through LD8 are respectively identical to the vertical positions of the centers of the corresponding ones of the aforementioned cross sections in the plane in the condensing lens 20.

The semiconductor lasers LD1 and LD3 constitute a first group which is arranged at a first position, and the semiconductor lasers LD5 and LD7 constitute a second group which is arranged at a second position different from the first position in the y and z directions. The semiconductor lasers LD2 and LD4 constitute a third group which is arranged at a third position on the side opposite to the first and second groups with respect to the optical axis of the condensing lens 20, and the semiconductor lasers LD6 and LD8 constitute a fourth group which is arranged at a fourth position different from the third position in the y and z directions. In addition, the third position is different in the y and z directions from the position opposite to the first position with respect to the optical axis of the condensing lens 20.

Similar to the fifth embodiment, the optical path lengths of the eight parallel laser beams from the collimator lenses C1 through C8 to the condensing lens 20 are identical. Therefore, even when the parallelism between the eight laser beams is not so high, it is possible to suppress inaccuracy in the aforementioned beam cross-section pattern BP6.

Each of the deflection members P61 through P68 has a similar function to each of the deflection members P2 and P3 in the first embodiment. The deflection members P61 through P68 are right-angle prisms having a 45-degree inclined face. The 45-degree inclined face is dielectric (high reflection) coated so as to realize a reflection face, and the edges having the 45-degree edge angle are knife-edged. The 45-degree inclined face of each of the deflection members P61 through P68 has such a size that the entire cross section of the corresponding laser beam can be reflected by the 45-degree inclined face.

Similarly to the deflection members P1, P2, and P3 in the first embodiment, the deflection members P61 through P68 are respectively arranged at the intersections of the laser beams emitted from the corresponding semiconductor lasers and the corresponding straight lines being parallel to the optical axis of the condensing lens 20 and passing through the effective area of the condensing lens 20, and the reflection faces of the deflection members P61 through P68 form an angle of 45 degrees with the z direction, so that the laser beams emitted from the semiconductor lasers LD1 through LD8 in the x direction are deflected by the deflection angle of 90 degrees, and the deflected laser beams propagate in the z direction and form the beam cross-section pattern BP6 in the condensing lens 20. In addition, the shape, size, and arrangement of each of the deflection members P61 through P68 are designed so that the entire laser beam reflected by the deflection member is incident on the effective area of the condensing lens 20, and the deflection member does not stand in the optical path of any of laser beams which propagate from the rear of the deflection member.

Seventh Embodiment

Figure 19:
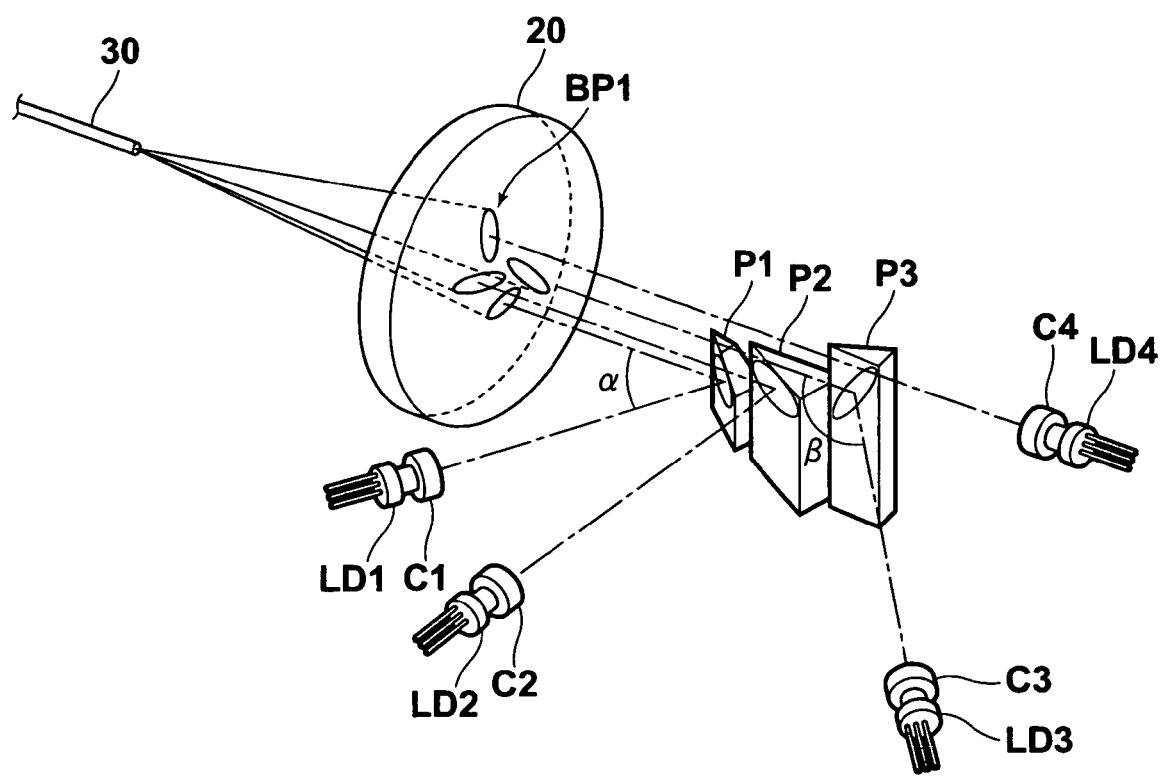
FIG. 19 is a perspective view of a combined laser source according to a seventh embodiment of the present invention.

In the first through sixth embodiments, the laser beams emitted from the semiconductor lasers and deflected by the deflection members in the x-z plane, and the deflection angle is 90 degrees. However, the directions of the laser beams may not be confined within the x-z plane, and the deflection angle may not be limited to 90 degrees, as in the combined laser source according to the seventh embodiment. FIG. 19 is a perspective view of the combined laser source according to the seventh embodiment. The combined laser source according to the seventh embodiment is different from the first embodiment in the arrangement of the semiconductor lasers LD1 and LD3 and the deflection members P1 and P3 and the directions of the laser beams emitted from the semiconductor lasers LD1 and LD3.

In the construction of FIG. 19, the directions of the laser beams are emitted from the semiconductor lasers LD1, LD2, and LD3 in directions different from each other, and are not contained in a plane. The orientations of the reflection faces of the deflection members P1 and P3 in the seventh embodiment are respectively different from the orientations in the first embodiment in the x-z plane (i.e., around the y direction), so that the angles which the deflection members P1 and P3 make with the z direction are not 45 degrees. Specifically, the deflection angle $\alpha$ by which the laser beam emitted from the semiconductor laser LD1 is deflected by the deflection member P1 is an acute angle, and the deflection angle $\beta$ by which the laser beam emitted from the semiconductor laser LD3 is deflected by the deflection member P3 is an obtuse angle.

Eighth Embodiment

Figure 20:
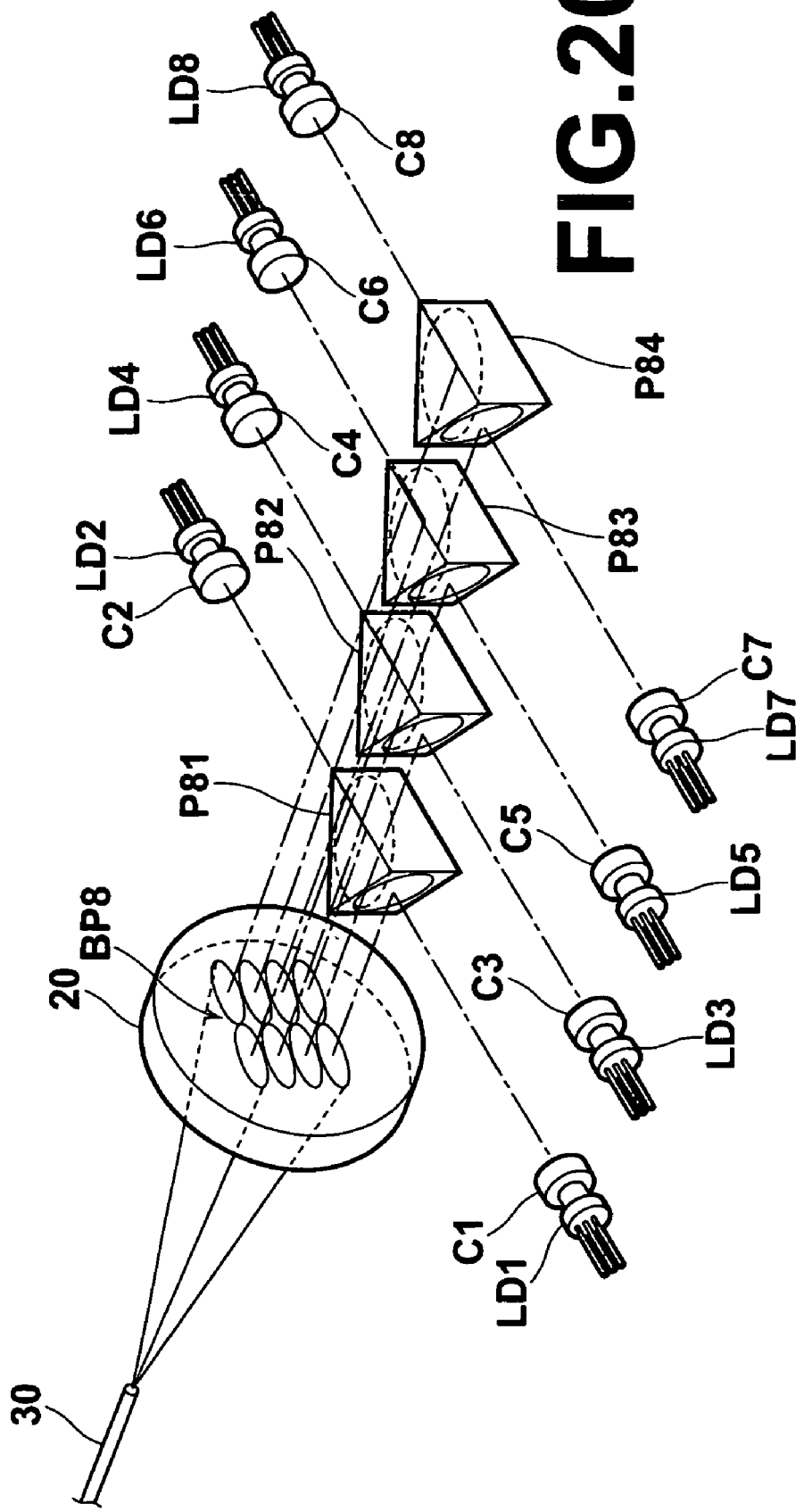
FIG. 20 is a perspective view of a combined laser source according to an eighth embodiment of the present invention.
Figure 21A:
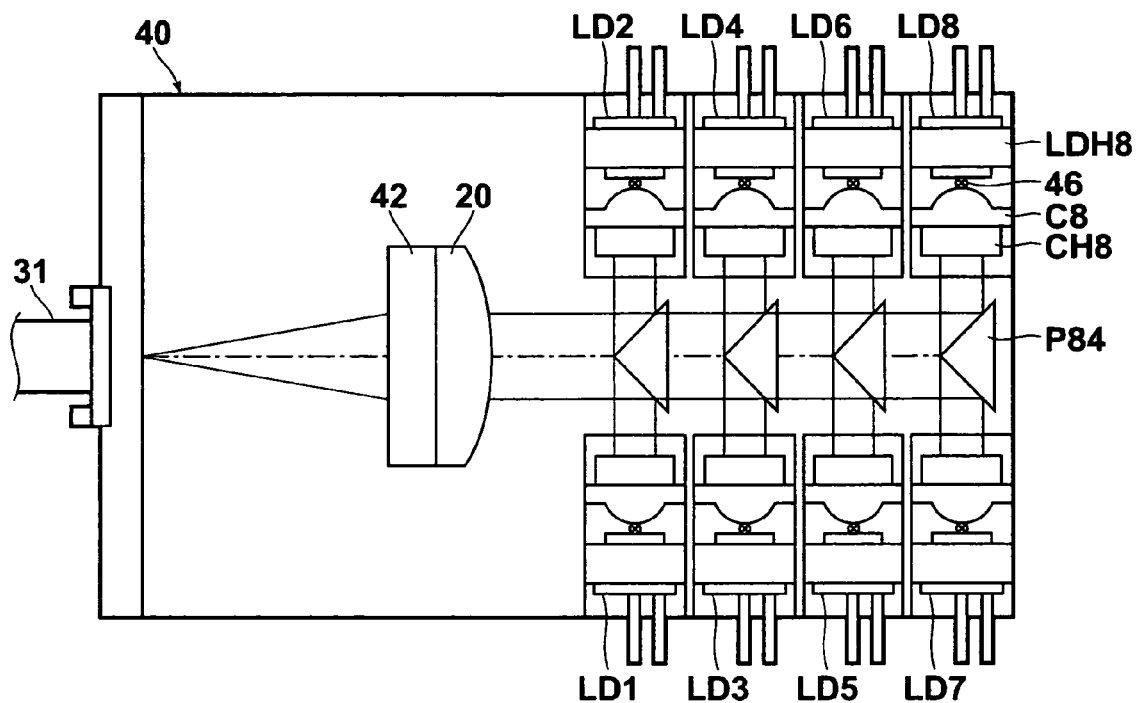
FIGS. 21A and 21B are plan and side views of the combined laser source according to the eighth embodiment.
Figure 21B:
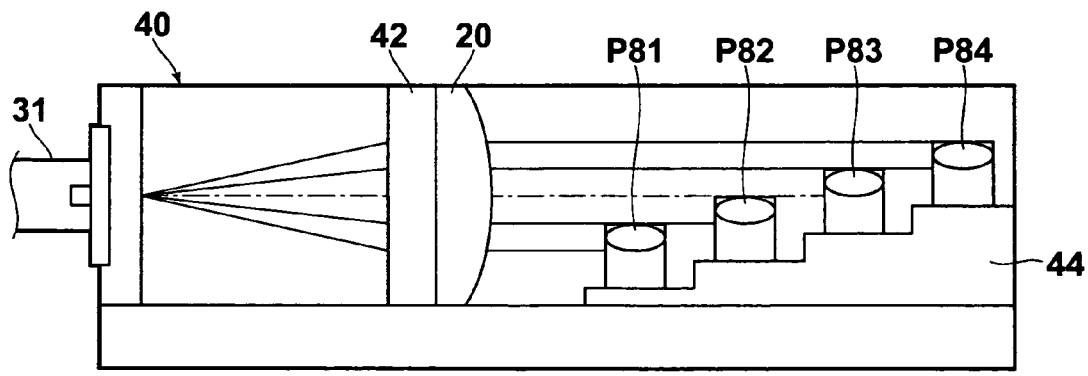

Hereinbelow, a combined laser source according to the eighth embodiment of the present invention is explained below with reference to FIGS. 20, 21A, and 21B. FIGS. 20, 21A, and 21B are respectively perspective, plan, and side views of the combined laser source according to the eighth embodiment. In FIGS. 20, 21A, and 21B, the z direction corresponds to the direction of the optical axis of the condensing lens 20, and x and y directions are perpendicular to the z direction. Specifically, FIG. 21A is a view from the y direction, and FIG. 21B is a view from the x direction. In addition, members and components for holding optical components, which are shown in FIG. FIGS. 21A and 21B, are not shown in FIG. 20, and semiconductor lasers and collimator lenses are not shown in FIG. 21B.

The combined laser source according to the eighth embodiment comprises eight semiconductor lasers LD1 through LD8, eight collimator lenses C1 through C8, four deflection members P81 through P84, a condensing lens 20, and an optical fiber 30.

The eight semiconductor lasers LD1 through LD8 emit eight divergent laser beams. The eight collimator lenses C1 through C8 are respectively arranged in the vicinities of the light-emission ends of the semiconductor lasers LD1 through LD8, and collimate the divergent laser beams emitted from the semiconductor lasers LD1 through LD8. The four deflection members P81 through P84 deflect the eight laser beams collimated by the collimator lenses C1 through C8 so that the eight laser beams collimated by the collimator lenses C1 through C8 enter the condensing lens 20. The condensing lens 20 condenses the eight laser beams deflected by the deflection members P81 through P84 so that the eight laser beams condensed by the condensing lens 20 enter the optical fiber 30.

The eight laser beams which enter the condensing lens 20 respectively have approximately elliptical cross sections in a plane contained in the condensing lens 20 and perpendicular to the optical axis of the condensing lens 20. The elliptical cross sections are contiguously arranged in two vertical rows (approximately along the x and y directions) as illustrated in FIG. 20, where the major axes of the cross sections are aligned approximately parallel to the x direction. That is, a beam cross-section pattern BP8 of the 4×2 beam cross sections is formed in the plane contained in the condensing lens 20 and perpendicular to the optical axis of the condensing lens 20.

In FIG. 20, the shape of the condensing lens 20 is schematically illustrated, the optical axis of the optical path from each of the collimator lenses C1 through C8 to the condensing lens 20 is indicated by a dash-dot line, and a line representing the laser beam from each of the aforementioned cross sections to the optical fiber 30 is indicated by a solid and/or dashed line. In addition, in FIGS. 20 and 21B, beam spots formed on reflection faces (explained later) of the deflection members P81 through P84 are also schematically indicated.

The four semiconductor lasers LD1, LD3, LD5, and LD7 constitute a first group, and are arranged on one side of the optical axis of the condensing lens 20 at adjustable intervals so that the laser beams are emitted from the semiconductor lasers LD1, LD3, LD5, and LD7 in the x direction. The four semiconductor lasers LD2, LD4, LD6, and LD8 constitute a second group, and are arranged on the opposite side of the optical axis of the condensing lens 20 at the positions opposite to the semiconductor lasers LD1, LD3, LD5, and LD7 in the first group so that the laser beams are emitted from the semiconductor lasers LD2, LD4, LD6, and LD8 in the x direction. The vertical positions (in the y direction) of the emission points of the semiconductor lasers LD1 through LD8 are respectively identical to the vertical positions of the centers of the corresponding ones of the aforementioned cross sections in the plane in the condensing lens 20.

As illustrated in FIG. 21A, the four semiconductor lasers LD1, LD3, LD5, and LD7 in the first group and the four semiconductor lasers LD2, LD4, LD6, and LD8 in the second group are arranged at the symmetric positions with respect to the y-z plane containing the optical axis of the condensing lens 20. In addition, the semiconductor lasers LD1, LD3, LD5, and LD7 in the first group are arranged along a straight line, and the semiconductor lasers LD2, LD4, LD6, and LD8 in the second group are also arranged along a straight line. Thus, the entire optical system can be simply and compactly constructed, and assembly of the combined laser source is easy.

Each of the deflection members P81 through P84 has two reflection faces each of which has a basically similar function to the reflection face of each of the deflection members P2 and P3 in the first embodiment. The deflection member P81 deflects the laser beams emitted from the semiconductor lasers LD1 and LD2, the deflection member P82 deflects the laser beams emitted from the semiconductor lasers LD3 and LD4, the deflection member P83 deflects the laser beams emitted from the semiconductor lasers LD5 and LD6, and the deflection member P84 deflects the laser beams emitted from the semiconductor lasers LD7 and LD8. The deflection members P81 through P84 are also right-angle prisms having a 45-degree inclined face, and may be ones of the commercially available standard right-angle prisms. However, the deflection members P81 through P84 used in the eighth embodiment are different from the deflection members P2 and P3 in the first embodiment in that the two side faces of each of the deflection members P81 through P84 other than the 45-degree inclined face are dielectric (high reflection) coated so as to realize the two reflection faces. Since the eight laser beams can be deflected by the four deflection members, the number of the necessary deflection members is reduced by half, so that the total cost of the combined laser source can be reduced by the reduction in the number of components.

Similarly to the deflection members P1, P2, and P3 in the first embodiment, the deflection members P81 through P84 are respectively arranged at the intersections of the laser beams emitted from the corresponding semiconductor lasers and the corresponding straight lines being parallel to the optical axis of the condensing lens 20 and passing through the effective area of the condensing lens 20, and the reflection faces of the deflection members P81 through P84 form an angle of 45 degrees with the z direction, so that the laser beams emitted from the semiconductor lasers LD1 through LD8 in the x direction are deflected by the deflection angle of 90 degrees, and the deflected laser beams propagate in the z direction and form the beam cross-section pattern BP8 in the condensing lens 20. In addition, the shape, size, and arrangement of each of the deflection members P81 through P84 are designed so that the entire laser beams reflected by the deflection member are incident on the effective area of the condensing lens 20, and the deflection member does not stand in the optical path of any of laser beams which propagate from the rear of the deflection member.

Figure 22:
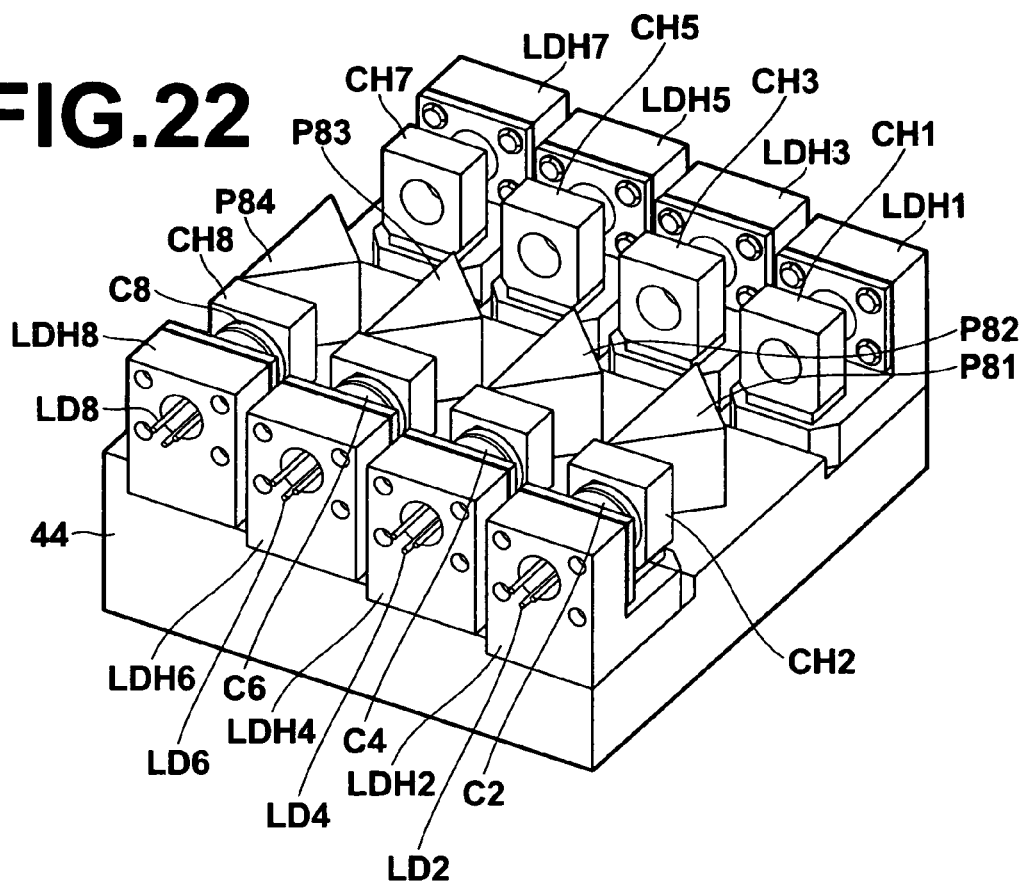
FIG. 22 is a perspective view of a holder structure in the combined laser source according to the eighth embodiment.

Next, a holder structure for holding the optical components of the combined laser source according to the eighth embodiment is explained below with reference to FIGS. 21A, 21B, and 22. FIG. 22 is a perspective view of a holder structure for holding the semiconductor lasers, the collimator lenses, and the deflection members in the combined laser source according to the eighth embodiment. FIG. 22 shows a partially assembled structure in which the semiconductor lasers LD1, LD3, LD5, and LD7 and the collimator lenses C1, C3, C5, and C7 are not yet mounted. In addition, in FIG. 21A, the reference numerals of part of the components are not shown for simplifying the illustration.

As illustrated in FIGS. 21A and 21B, the optical components constituting the combined laser source is contained in a box type package 40. The package 40 has an opening on its upper side, and is provided with a cover (not shown). Thus, when the opening of the package 40 is closed with the cover, the optical components constituting the combined laser source are held in a hermetically sealed space enclosed by the package 40 and the cover.

A fiber holder 31 for holding the light-entrance end of the multimode optical fiber 30 is fixed to an end of the package 40. A condensing-lens holder 42 for holding the condensing lens 20 is fixed on an upper surface of a bottom of the package 40. In addition, a base plate 44, which has a steplike longitudinal cross section as illustrated in FIG. 21B, is fixed to the bottom of the package 40.

The four deflection members P81 through P84 are arranged along the optical axis of the condensing lens 20 at the center of the upper surface of the base plate 44, and LD holders LDH1 through LDH8 are arranged at opposite positions on both sides of the deflection members P81 through P84. Each of the LD holders LDH1 through LDH8 is formed of a vertical portion and a horizontal portion, has an L-shaped cross section, and is placed so that the vertical portion is located outside. In addition, through holes are formed in the vertical portions of the LD holders LDH1 through LDH8, respectively, so that the semiconductor laser elements LD1 to LD8 can be respectively pressed into the through holes, and the major axes of the cross sections of the laser beams emitted from the semiconductor laser elements LD1 to LD8 can be oriented in the desired directions.

Collimator-lens holders CH1 through CH8 for holding the collimator lenses C1 through C8 are arranged on the upper surfaces of the horizontal portions of the LD holders LDH1 through LDH8, respectively. The collimator-lens holders CH1 through CH8 also have through holes at the positions corresponding to the through holes of the LD holders LDH1 through LDH8; respectively, so that the laser beams emitted from the semiconductor laser elements LD1 to LD8 and collimated by the collimator lenses C1 through C8 propagate to the deflection members through the through holes of the collimator-lens holders CH1 through CH8, respectively.

The LD holders LDH1 through LDH8 are detachably fixed to the base plate 44 with screws 46 which pass through the horizontal portions of the LD holders LDH1 through LDH8. Thus, the operations of adjusting the optical axes of the laser beams and individually replacing the semiconductor lasers are easy, so that the yield rate of the combined laser source can be increased. Although the screws 46 are indicated between the semiconductor lasers and the collimator lenses in FIG. 21A, the screws 46 may not be arranged at the positions indicated in FIG. 21A. Further, each of the LD holders LDH1 through LDH8 may be fixed to the base plate 44 with more than one screw. For example, each of the LD holders LDH1 through LDH8 may be fixed to the base plate 44 with four screws at the four corners of the horizontal portion of the LD holder.

When the combined laser source is assembled, the deflection members and the semiconductor lasers are first mounted, and then the collimator lenses and the lens holders are mounted. Thereafter, the semiconductor lasers are activated, and the collimator lenses are adjusted in the x, y, and z directions so as to obtain the collimated laser beams. In the above structure, it is also possible to correct inaccuracy in mounting of the other components by only the adjustment of the collimator lenses. After the laser beams are collimated, the contact surfaces of the lens holders and the collimator lenses and the contact surfaces of the lens holders and the horizontal portions of the LD holders are fixed with, for example, solder, brazing material, ultraviolet-curable adhesive, or the like.

Ninth Embodiment

Figure 23:
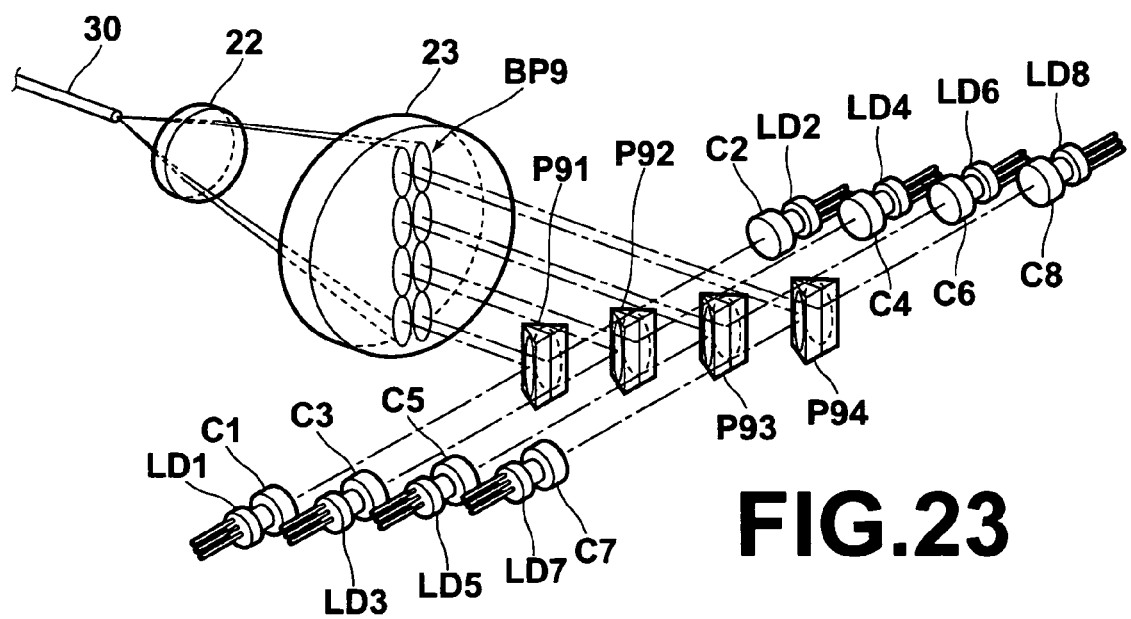
FIG. 23 is a perspective view of a combined laser source according to a ninth embodiment of the present invention.
Figure 24A:
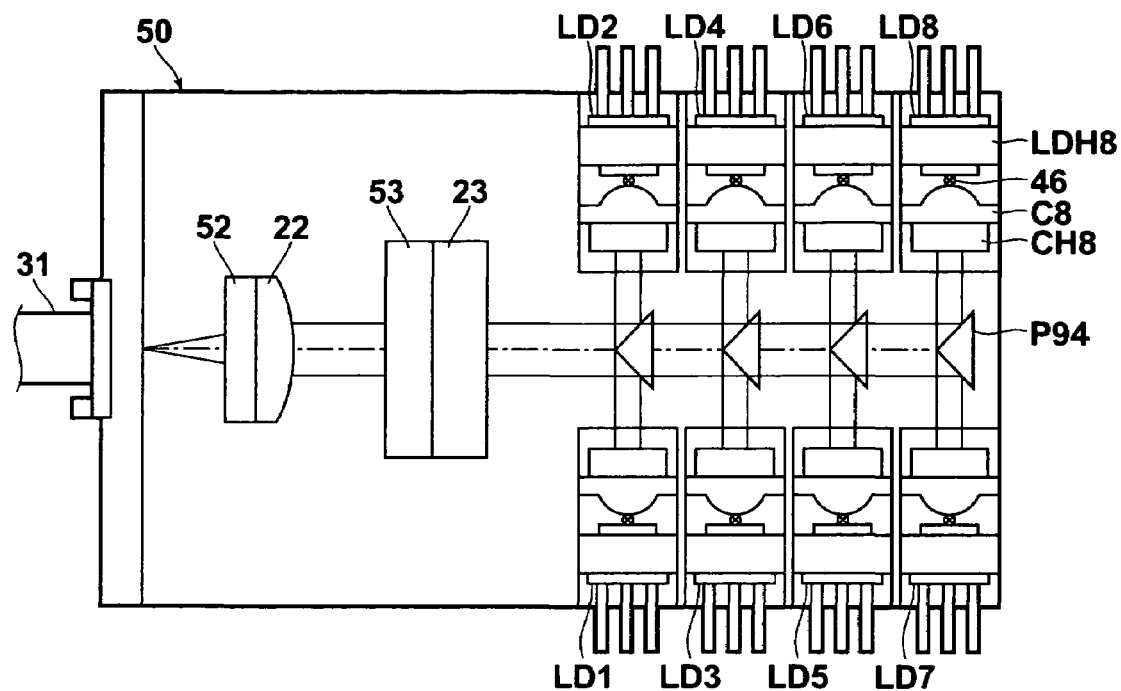
FIGS. 24A and 24B are plan and side views of the combined laser source according to the ninth embodiment.
Figure 24B:
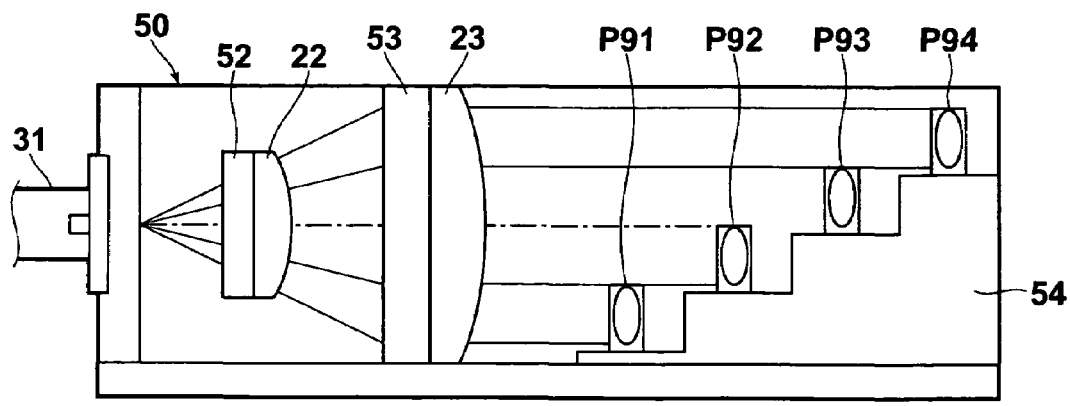

Hereinbelow, a combined laser source according to the ninth embodiment of the present invention is explained below with reference to FIGS. 23, 24A, and 24B. FIGS. 23, 24A, and 24B are respectively perspective, plan, and side views of the combined laser source according to the ninth embodiment. In FIGS. 23, 24A, and 24B, the z direction corresponds to the direction of the optical axis of the condensing lenses 22 and 23, and x and y directions are perpendicular to the z direction. Specifically, FIG. 24A is a view from the y direction, and FIG. 24B is a view from the x direction. In addition, members and components for holding optical components, which are shown in FIG. FIGS. 24A and 24B, are not shown in FIG. 23, and semiconductor lasers and collimator lenses are not shown in FIG. 24B.

The combined laser source according to the ninth embodiment comprises eight semiconductor lasers LD1 through LD8, eight collimator lenses C1 through C8, four deflection members P91 through P94, two condensing lenses 22 and 23, and an optical fiber 30.

The eight semiconductor lasers LD1 through LD8 emit eight divergent laser beams. The eight collimator lenses C1 through C8 are respectively arranged in the vicinities of the light-emission ends of the semiconductor lasers LD1 through LD8, and collimate the divergent laser beams emitted from the semiconductor lasers LD1 through LD8. The four deflection members P91 through P94 deflect the eight laser beams collimated by the collimator lenses C1 through C8 so that the eight laser beams collimated by the collimator lenses C1 through C8 enter the condensing lens 23. The condensing lenses 23 and 22 condense the eight laser beams deflected by the deflection members P91 through P94 so that the eight laser beams condensed by the condensing lenses 23 and 22 enter the optical fiber 30.

The combined laser source according to the ninth embodiment is different from the combined laser sources according to the first to the eighth embodiments in that the two condensing lenses 22 and 23 are used for optically combining the laser beams. The condensing lens 22 is an anamorphic lens having different magnification powers in the x and y directions, and the condensing lens 23 is a cylindrical lens having a magnification power in only the y direction.

The eight laser beams which enter the condensing lens 23 respectively have approximately elliptical cross sections in a plane contained in the condensing lens 23 and perpendicular to the optical axis of the condensing lenses 22 and 23. The elliptical cross sections are contiguously arranged in two vertical rows (approximately along the x and y directions) as illustrated in FIG. 23, where the major axes of the cross sections are aligned approximately parallel to the y direction. That is, a beam cross-section pattern BP9 of the 4×2 beam cross sections is formed in the plane contained in the condensing lens 23 and perpendicular to the optical axis of the condensing lenses 22 and 23.

In FIG. 23, the shapes of the condensing lenses 22 and 23 are schematically illustrated, the optical axis of the optical path from each of the collimator lenses C1 through C8 to the condensing lens 23 is indicated by a dash-dot line, and a line representing the laser beam from each of the aforementioned cross sections to the optical fiber 30 is indicated by a solid and/or dashed line. In addition, in FIGS. 23 and 24B, beam spots formed on reflection faces (explained later) of the deflection members P91 through P94 are also schematically indicated.

The four semiconductor lasers LD1, LD3, LD5, and LD7 constitute a first group, and are arranged on one side of the optical axis of the condensing lenses 22 and 23 at adjustable intervals so that the laser beams are emitted from the semiconductor lasers LD1, LD3, LD5, and LD7 in the x direction. The four semiconductor lasers LD2, LD4, LD6, and LD8 constitute a second group, and are arranged on the opposite side of the optical axis of the condensing lenses 22 and 23 at the positions opposite to the semiconductor lasers LD1, LD3, LD5, and LD7 in the first group so that the laser beams are emitted from the semiconductor lasers LD2, LD4, LD6, and LD8 in the x direction. The vertical positions (in the y direction) of the emission points of the semiconductor lasers LD1 through LD8 are respectively identical to the vertical positions of the centers of the corresponding ones of the aforementioned cross sections in the plane in the condensing lens 23.

As illustrated in FIG. 24A, the four semiconductor lasers LD1, LD3, LD5, and LD7 in the first group and the four semiconductor lasers LD2, LD4, LD6, and LD8 in the second group are arranged at the symmetric positions with respect to the y-z plane containing the optical axis of the condensing lenses 22 and 23. In addition, the semiconductor lasers LD1, LD3, LD5, and LD7 in the first group are arranged along a straight line, and the semiconductor lasers LD2, LD4, LD6, and LD8 in the second group are also arranged along a straight line. Thus, the entire optical system can be simply and compactly constructed, and assembly of the combined laser source is easy.

The deflection members P91 through P94 have basically similar functions to the deflection members P81 through P84. The deflection member P81 deflects the laser beams emitted from the semiconductor lasers LD1 and LD2, the deflection member P82 deflects the laser beams emitted from the semiconductor lasers LD3 and LD4, the deflection member P83 deflects the laser beams emitted from the semiconductor lasers LD5 and LD6, and the deflection member P84 deflects the laser beams emitted from the semiconductor lasers LD7 and LD8. The deflection members P91 through P94 are also right-angle prisms having a 45-degree inclined face, and each of the deflection members P91 through P94 have two reflection faces, which are the two side faces of the deflection member other than the 45-degree inclined face and dielectric (high reflection) coated. Since two laser beams can be deflected by each of the four deflection members as in the eighth embodiment, the total cost of the combined laser source can be reduced by the reduction in the number of components.

Similarly to the deflection members P1, P2, and P3 in the first embodiment, the deflection members P91 through P94 are respectively arranged at the intersections of the laser beams emitted from the corresponding semiconductor lasers and the corresponding straight lines being parallel to the optical axis of the condensing lenses 22 and 23 and passing through the effective areas of the condensing lenses 22 and 23, and the reflection faces of the deflection members P91 through P94 form an angle of 45 degrees with the z direction, so that the laser beams emitted from the semiconductor lasers LD1 through LD8 in the x direction are deflected by the deflection angle of 90 degrees, and the deflected laser beams propagate in the z direction and form the beam cross-section pattern BP9 in the condensing lens 23. In addition, the shape, size, and arrangement of each of the deflection members P91 through P94 are designed so that the entire laser beam reflected by the deflection member is incident on the effective area of the condensing lens 23, and the deflection member does not stand in the optical path of any of laser beams which propagate from the rear of the deflection member.

As illustrated in FIGS. 24A and 24B, the optical components constituting the combined laser source according to the ninth embodiment is contained in a box type package 50. The package 50 has an opening on its upper side, and is provided with a cover (not shown). Thus, when the opening of the package 50 is closed with the cover, the optical components constituting the combined laser source are held in a hermetically sealed space enclosed by the package 50 and the cover.

A fiber holder 31 for holding the light-entrance end of the multimode optical fiber 30 is fixed to an end of the package 50. Condensing-lens holders 52 and 53, which respectively hold the condensing lenses 22 and 23, are fixed on an upper surface of a bottom of the package 50. In addition, a base plate 54, which has a steplike longitudinal cross section as illustrated in FIG. 24B, is fixed to the bottom of the package 50. In addition, the semiconductor lasers, the collimator lenses, and the deflection members are held on the base plate 54 in a similar manner to the eighth embodiment illustrated in FIG. 22.

Position Precision

Hereinbelow, comparison of position precision is made between the combined laser sources according to the second, eighth, and ninth embodiments.

The laser beams emitted from the semiconductor lasers are collimated and deflected so as to have predetermined cross sections, and are then condensed so as to enter the core of the optical fiber. Therefore, if the positions of the semiconductor lasers and the collimator lenses are not precisely aligned, the condensed laser beams deviate from the core of the optical fiber, so that optical loss occurs. However, if too high precision is required in the positions of the semiconductor lasers and the collimator lenses, the assembly cost unpreferably increases. Thus, a tolerance range in which each collimator lens can move without causing deviation of the condensed laser beam (collimated by the collimator lens) from the core of the optical fiber is obtained for each of the combined laser sources according to the second, eighth, and ninth embodiments, and comparison of position precision is made between the combined laser sources according to the second, eighth, and ninth embodiments. When the tolerance range is narrower, higher precision is required.

First, the position precision in the combined laser source according to the second embodiment is considered. At this time, it is assumed that the collimator lenses are designed as described before, and the numerical aperture at the light-entrance end of the optical fiber is 0.2. In order to prevent deviation of the condensed laser beams from the core of the optical fiber, it is necessary that all the laser beams which form the aforementioned beam cross-section pattern BP2 in the plane perpendicular to the optical axis of the condensing lens 20 enter the optical fiber. Since the effective diameters of the collimator lenses are 3.6×1.2 mm, the distance from the center to the outermost edge of the beam cross-section pattern BP2 is 3.6+(1.2/2)=4.2 mm, which can be deemed to be the effective radius of the beam cross-section pattern BP2. Therefore, in order that all the laser beams which form the aforementioned beam cross-section pattern BP2 enter the optical fiber having the numerical aperture of 0.2, it is sufficient that the focal length of the condensing lens be 21 mm, which is obtained by dividing the effective radius of the beam cross-section pattern BP2 by the numerical aperture. At this time, the magnification power of optical system becomes seven, which is obtained by dividing the focal length of the condensing lens by the focal length (3 mm) of each collimator lens.

In addition, in the case where each laser beam has diameters of 7 and 1.5 micrometers in the major- and minor-axis directions at the light-exit end of the corresponding semiconductor laser, the diameters of each laser beam are increased to 49 and 10.5 micrometers in the major- and minor-axis directions at the light-entrance end of the optical fiber by the above magnification power (seven). Since higher precision is required for the greater diameter, 49 micrometers, the tolerance is considered below based on the greater diameter, 49 micrometers. The tolerance range for the deviation of the laser beam at the light-entrance end of the optical fiber is calculated as the difference between the core diameter and the beam diameter. When the core diameter of the optical fiber is 60 micrometers, the tolerance range becomes 11 (=60−49) micrometers. At this time, the tolerance range for the deviation of the laser beam at each collimator lens becomes 1.57 micrometers, which is obtained by dividing the above tolerance range (11 micrometers) at the light-entrance end of the optical fiber by the magnification power (seven). Since the above tolerance range is the full tolerance between the opposite limits, the tolerance from the center to each limit is ±0.78 micrometers. When the position of a laser beam at the light-entrance end of the optical fiber moves beyond the tolerance range, the laser beam deviates from the optical fiber, so that optical loss occurs.

Next, the position precision in the combined laser source according to the eighth embodiment is considered. At this time, it is assumed that the collimator lenses are designed as described before, and the numerical aperture at the light-entrance end of the optical fiber is also 0.2. The effective radius of the beam cross-section pattern BP8 (i.e., the distance from the center to the outermost edge of the beam cross-section pattern BP8) is $(3.7^2+2.6^2)^{1/2}=4.52$ mm. In this calculation, a margin of 0.1 mm is added to the diameters in the major- and minor axis directions of the cross section of each laser beam. Therefore, in order that all the laser beams which form the aforementioned beam cross-section pattern BP8 enter the optical fiber having the numerical aperture of 0.2, it is sufficient that the focal length of the condensing lens be 23.1 mm, which is obtained on the basis of the quotient of the effective radius of the beam cross-section pattern BP8 by the numerical aperture. At this time, the magnification power of optical system becomes 7.7, which is obtained by dividing the focal length of the condensing lens by the focal length (3 mm) of each collimator lens.

In addition, in the case where each laser beam has diameters of 7 and 1.5 micrometers in the major- and minor-axis directions at the light-exit end of the corresponding semiconductor laser, the diameters of each laser beam are increased to 54 and 11.6 micrometers in the major- and minor-axis directions at the light-entrance end of the optical fiber by the above magnification power (7.7). Since higher precision is required for the greater diameter of 54 micrometers, the tolerance is considered below based on the diameter of 54 micrometers. The tolerance range for the deviation of the laser beam at the light-entrance end of the optical fiber is obtained as the difference between the core diameter and the beam diameter. When the core diameter of the optical fiber is 60 micrometers, the tolerance range becomes 6 (=60−54) micrometers. At this time, the tolerance range for the deviation of the laser beam at each collimator lens becomes 0.78 micrometers, which is obtained by dividing the above tolerance range (6 micrometers) at the light-entrance end of the optical fiber by the magnification power (7.7). Since the above tolerance range is the full tolerance between the opposite limits, the tolerance from the center to each limit is ±0.39 micrometers. When the position of a laser beam at the light-entrance end of the optical fiber moves beyond the tolerance range, the laser beam deviates from the optical fiber, so that optical loss occurs.

Finally, the position precision in the combined laser source according to the ninth embodiment is considered. At this time, it is assumed that the collimator lenses are designed as described before. ←In the ninth embodiment, the anamorphic lens and the cylindrical lens which have different magnification powers in the x and y directions are used. Therefore, it is necessary to consider the position precision in each direction.

The effective radii of the beam cross-section pattern BP9 in the x and y directions (i.e., the distances from the center to the outermost edges of the beam cross-section pattern BP9 in the x and y directions) are respectively 1.3 mm and 7.4 mm. In this calculation, a margin of 0.1 mm is added to the diameter in each direction of each laser beam.

In the case where the numerical apertures corresponding to the maximum incident angles in the x and y directions on the light-entrance end of the optical fiber are respectively 0.095 and 0.165, the numerical aperture corresponding to the maximum incident angle in the direction of the diagonal of the beam cross-section pattern BP9 on the light-entrance end of the optical fiber becomes 0.19. The incident angle of the laser beams having the beam cross-section pattern BP9 is maximized in the direction of the diagonal of the beam cross-section pattern BP9. Therefore, the entire laser beams forming the beam cross-section pattern BP9 can enter the optical fiber having the numerical aperture of 0.2 with a sufficient margin. In the following calculation, the above values of the numerical apertures are used. In this case, the focal length in each direction can be obtained on the basis of the quotient of the effective diameter by the numerical aperture in the direction. Thus, the focal lengths in the x and y directions are obtained as 14.7 and 45.4, respectively, so that magnification powers in the x and y directions are obtained as 4.9 and 15, respectively.

In addition, in the case where each laser beam has diameters of 7 and 1.5 micrometers in the major- and minor-axis directions at the light-exit end of the corresponding semiconductor laser, the diameters of each laser beam are increased to 34.3 and 22.5 micrometers in the major- and minor-axis directions at the light-entrance end of the optical fiber by the above magnification powers in the x and y directions. The tolerance range for the deviation of the laser beam in the x direction at the light-entrance end of the optical fiber is the difference between the core diameter and the beam diameter in the x direction. When the core diameter of the optical fiber is 60 micrometers, the tolerance range in the x direction becomes 25.7 (=60−34.3) micrometers. At this time, the tolerance range for the deviation of the laser beam in the x direction at each collimator lens is obtained as 5.24 micrometers by dividing the above tolerance range (25.7 micrometers) at the light-entrance end of the optical fiber by the magnification power (4.9). Since the above tolerance range is the full tolerance between the opposite limits, the tolerance from the center to each limit in the x direction is ±2.62 micrometers. Similarly, the tolerance from the center to a limit in the y direction is obtained as ±1.25 micrometers.

The position precision required as above greatly relates to the cost of the combined laser source. Further, for example, the following factors affect the total cost.

(a) In the second embodiment, it is necessary to cut away a portion of a standard prism so that the prism does not block any portion of laser beams which propagate from the rear of the deflection member. Therefore, this operation raises the cost.

(b) In the ninth embodiment, the anamorphic lens and the cylindrical lens are used as the condensing lenses. Therefore, the cost of these lenses and the complicated adjustment raises the total cost.

On the other hand, in the eighth embodiment, the deflection members can be realized by standard products as they are. Therefore, special adjustment of the deflection members is unnecessary.

Variations and Additional Matters (1) In each of the embodiments explained above, the oscillation wavelengths and output power of the semiconductor lasers and the design (such as the shape) of the hermetically sealed package are not limited to the explained values or design. In addition, the collimator lenses, the deflection members, or the characteristics of the semiconductor lasers used in each combined laser source may not be identical. For example, semiconductor lasers having different wavelengths may be used in a combined laser source. Further, the number of semiconductor lasers constituting each of the aforementioned groups is not limited to the number mentioned before, and may be an arbitrary number greater than one.

(2) The focal lengths, effective diameters, numerical apertures, shapes, and the like of the collimator lenses are not limited to the explained values or design.

(3) The focal lengths, effective diameters, numerical apertures, shapes, and the like of the condensing lenses are not limited to the explained values or design. The types or the numbers of the components constituting the optical condensing systems are not limited to the explained values or design.

(4) The deflection members are not limited to the explained ones, and may be any reflective members. For example, mirrors (e.g., aluminum-evaporated mirrors or dielectric mirrors), instead of the prisms, may be used as the deflection members. Further, the reflective members realizing the deflection members may use total reflection or polarization beam splitters.

(5) The beam cross-section patterns formed in the plane perpendicular to the optical axis of the optical condensing system are not limited to the explained patterns, and any other beam cross-section patterns may be used.

(6) The number of the groups of semiconductor lasers, the relative positions of the groups of semiconductor lasers, and the deflection directions may be arbitrarily arranged.

(7) This application is based upon and claims the benefits of priority from the Japanese patent application Nos. 2005-166916 and 2005-238489, the entire contents of which are incorporated herein by reference.

What is claimed is:

1. A combined laser source comprising:
    a plurality of semiconductor lasers which contain emission elements emitting a plurality of laser beams and being separately and hermetically sealed;
    a plurality of collimator lenses which collimate said plurality of laser beams emitted from said emission elements of the plurality of semiconductor lasers;
    an optical condensing system which receives, condenses, and optically combines the plurality of laser beams collimated by said plurality of collimator lenses; and
    one or more deflection members which are arranged between said optical condensing system and one or more of said plurality of collimator lenses, and deflect one or more of the plurality of laser beams collimated by the one or more of the plurality of collimator lenses in directions different from an optical axis of the condensing system so that the one or more of the plurality of laser beams propagate parallel to the optical axis of the optical condensing system;
    wherein said plurality of semiconductor lasers are arranged so that a major axis of a cross section of one of said plurality of laser beams is different from a major axis of a cross section of another of the plurality of laser beams, each of said one or more deflection members is so positioned and has such a shape that the one or more deflection members do not block the plurality of laser beams, and the plurality of laser beams are arrayed in an approximately radial arrangement in a plane contained in the optical condensing system and perpendicular to said optical axis of the optical condensing system.

2. A combined laser source according to claim 1, wherein said one or more deflection members deflect said one or more of the plurality of laser beams by a deflection angle of approximately 90 degrees.

3. A combined laser source according to claim 1, wherein said one or more deflection members are one or more right-angle prisms each having a face inclined at an inclination angle of approximately 45 degrees.

4. A combined laser source according to claim 1, wherein when a first one of said one or more deflection members blocks a portion of a cross-sectional area within a $1/e^2$ radius of a first one of the plurality of laser beams other than a second one of the plurality of laser beams which said first one of the one or more deflection members deflects, and the portion is equal to or smaller than 20% of the cross-sectional area.

5. A combined laser source according to claim 1, wherein each of said plurality of semiconductor lasers has a hermetically-sealed package structure in which one of said emission elements is covered by a cap having an approximately cylindrical shape and a light-exit window at a top of the cap.

6. A combined laser source according to claim 1, further comprising an optical fiber into which an optically combined laser beam generated by said optical condensing system is inputted, and the optical fiber has a numerical aperture equal to or less than 0.3.

7. A combined laser source comprising:
    a plurality of semiconductor lasers which contain emission elements emitting a plurality of laser beams and being separately and hermetically sealed;
    a plurality of collimator lenses which collimate said plurality of laser beams emitted from said emission elements of the plurality of semiconductor lasers;
    an optical condensing system which receives, condenses, and optically combines the plurality of laser beams collimated by said plurality of collimator lenses; and
    one or more deflection members which are arranged between said optical condensing system and one or more of said plurality of collimator lenses, and deflect one or more of the plurality of laser beams collimated by the one or more of the plurality of collimator lenses in directions different from an optical axis of the condensing system so that the one or more of the plurality of laser beams propagate parallel to an optical axis of the optical condensing system,
    wherein said plurality of semiconductor lasers are groups of two or more semiconductor lasers arranged at opposite positions on both sides of said optical axis of the optical condensing system, and cross-sections of the plurality of laser beams are arrayed in an approximately matrix-like arrangement in a plane contained in the optical condensing system and perpendicular to the optical axis.

8. A combined laser source according to claim 7, wherein said plurality of laser beams have identical optical path lengths from said plurality of collimator lenses to said optical condensing system.

9. A combined laser source according to claim 7, wherein said one or more deflection members deflect said one or more of the plurality of laser beams by a deflection angle of approximately 90 degrees.

10. A combined laser source according to claim 7, wherein said one or more deflection members are one or more right-angle prisms each having a face inclined at an inclination angle of approximately 45 degrees.

11. A combined laser source according to claim 7, wherein when a first one of said one or more deflection members blocks a portion of a cross-sectional area within a $1/e^2$ radius of a first one of the plurality of laser beams other than a second one of the plurality of laser beams which said first one of the one or more deflection members deflects, and the portion is equal to or smaller than 20% of the cross-sectional area.

12. A combined laser source according to claim 7, wherein each of said plurality of semiconductor lasers has a hermetically-sealed package structure in which one of said emission elements is covered by a cap having an approximately cylindrical shape and a light-exit window at a top of the cap.

13. A combined laser source according to claim 7, further comprising an optical fiber into which an optically combined laser beam generated by said optical condensing system is inputted, and the optical fiber has a numerical aperture equal to or less than 0.3.

14. A combined laser source comprising:
- a plurality of semiconductor lasers which contain emission elements emitting a plurality of laser beams and being separately and hermetically sealed;
- a plurality of collimator lenses which collimate said plurality of laser beams emitted from said emission elements of the plurality of semiconductor lasers;
- an optical condensing system which receives, condenses, and optically combines the plurality of laser beams collimated by said plurality of collimator lenses; and
- one or more deflection members which are arranged between said optical condensing system and one or more of said plurality of collimator lenses, and deflect one or more of the plurality of laser beams collimated by the one or more of the plurality of collimator lenses in directions different from an optical axis of the condensing system so that the one or more of the plurality of laser beams propagate parallel to an optical axis of the optical condensing system,
- wherein said plurality of semiconductor lasers are groups of two or more semiconductor lasers, the groups are arranged at first positions on a first side of said optical axis and second positions on a second side of the optical axis, the second positions correspond to the first positions, each of the second positions is different from a position opposite to one of the first positions corresponding to said each of the second positions with respect to the optical axis, in one or both of a first direction parallel to said optical axis of the optical condensing system and a second direction perpendicular to the first direction, and cross sections of the plurality of laser beams are arrayed in an approximately matrix-like arrangement in a plane contained in the optical condensing system and perpendicular to the optical axis.

15. A combined laser source according to claim 14, wherein said plurality of laser beams have identical optical path lengths from said plurality of collimator lenses to said optical condensing system.

16. A combined laser source according to claim 14, wherein said plurality of laser beams have identical optical path lengths from said plurality of collimator lenses to said optical condensing system.

17. A combined laser source according to claim 14, wherein said one or more deflection members are one or more right-angle prisms each having a face inclined at an inclination angle of approximately 45 degrees.

18. A combined laser source according to claim 14, wherein when a first one of said one or more deflection members blocks a portion of a cross-sectional area within a $1/e^2$ radius of a first one of the plurality of laser beams other than a second one of the plurality of laser beams which said first one of the one or more deflection members deflects, and the portion is equal to or smaller than 20% of the cross-sectional area.

19. A combined laser source according to claim 14, wherein each of said plurality of semiconductor lasers has a hermetically-sealed package structure in which one of said emission elements is covered by a cap having an approximately cylindrical shape and a light-exit window at a top of the cap.

20. A combined laser source according to claim 14, further comprising an optical fiber into which an optically combined laser beam generated by said optical condensing system is inputted, and the optical fiber has a numerical aperture equal to or less than 0.3.

* * * * *